(12) United States Patent
Abe

(10) Patent No.: US 9,130,924 B2
(45) Date of Patent: Sep. 8, 2015

(54) INFORMATION INPUT DEVICE, INFORMATION OUTPUT DEVICE, INFORMATION PROCESSING SYSTEM, AND COMPUTER-READABLE RECORDING MEDIUM

(71) Applicant: Sachiko Abe, Kanagawa (JP)

(72) Inventor: Sachiko Abe, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/136,094

(22) Filed: Dec. 20, 2013

(65) Prior Publication Data

US 2014/0189815 A1 Jul. 3, 2014

(30) Foreign Application Priority Data

Dec. 27, 2012 (JP) ................................. 2012-284979

(51) Int. Cl.
 *G06F 15/16* (2006.01)
 *G06F 17/30* (2006.01)
 *H04L 29/06* (2006.01)
(52) U.S. Cl.
 CPC ...................................... *H04L 63/08* (2013.01)
(58) Field of Classification Search
 CPC ....................................................... H04L 63/08
 USPC ............................................................. 726/4
 See application file for complete search history.

(56) References Cited

U.S. PATENT DOCUMENTS

| 2003/0051139 | A1 | 3/2003 | Kubota | |
| 2003/0126326 | A1* | 7/2003 | Nomizo et al. | 710/72 |
| 2005/0160479 | A1* | 7/2005 | Kubota | 726/16 |
| 2008/0028217 | A1 | 1/2008 | Kubota | |
| 2009/0125984 | A1* | 5/2009 | Bilger et al. | 726/4 |
| 2010/0257586 | A1 | 10/2010 | Kubota | |
| 2011/0066671 | A1* | 3/2011 | Motohashi | 709/201 |
| 2012/0311668 | A1* | 12/2012 | Kubota | 726/2 |

FOREIGN PATENT DOCUMENTS

| JP | 3707407 | 8/2005 |
| JP | 2011-066485 | 3/2011 |

OTHER PUBLICATIONS

Christoph Ganser, InfrActables: Multi-User Tracking System for Interactive Surfaces; IEEE; 2006; p. 1-4.*

* cited by examiner

*Primary Examiner* — Monjour Rahim
(74) *Attorney, Agent, or Firm* — Oblon, McClelland, Maier & Neustadt, L.L.P.

(57) ABSTRACT

The present invention is concerning to an information processing system includes an information input device and an information output device. The information input device includes a communication module that establishes communication with one or more information output devices, an information acquiring module that acquires device information of the respective information output devices including an identification code used only for identifying the information output device and makes a storage module store therein the device information, an input receiving module that receives an entry of an identification code, and a device specifying module that searches the device information acquired from the respective information output devices to specify the information output device to which the information is to be transmitted based on the identification code received and gives instructions to the communication module to transmit the information using the device information of the information output device specified.

16 Claims, 18 Drawing Sheets

FIG.1
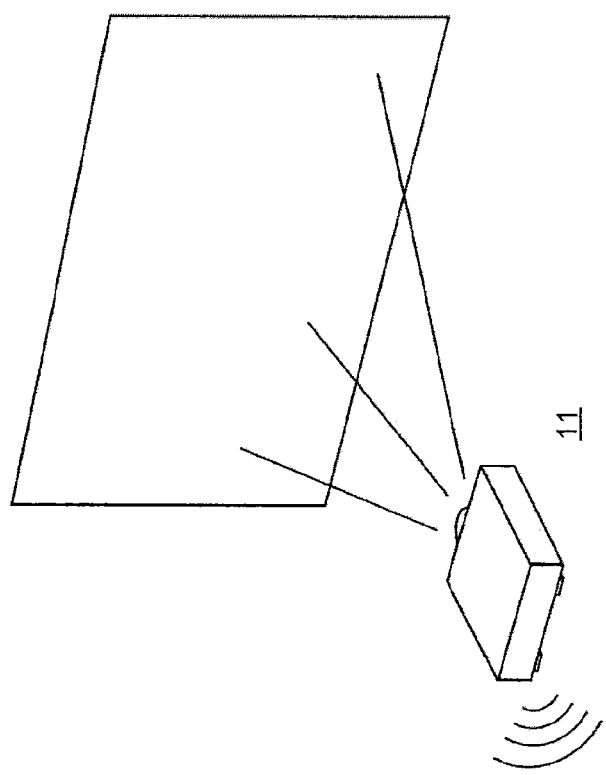
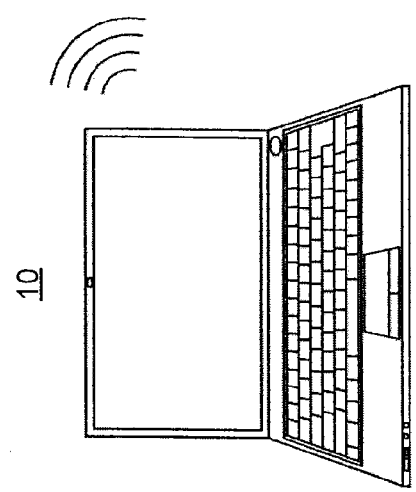

| IDENTIFICATION CODE | IP ADDRESS | PROJECTOR NAME |
|---|---|---|
| 1111 | 111.111.111.111 | projector01 |
| 2222 | 222.222.222.222 | projector02 |

INFORMATION INPUT DEVICE, INFORMATION OUTPUT DEVICE, INFORMATION PROCESSING SYSTEM, AND COMPUTER-READABLE RECORDING MEDIUM

CROSS-REFERENCE TO RELATED APPLICATIONS

The present application claims priority to and incorporates by reference the entire contents of Japanese Patent Application No. 2012-284979 filed in Japan on Dec. 27, 2012.

BACKGROUND OF THE INVENTION

1. Field of the Invention

The present invention relates to an information input device that input therein information, an information output device that outputs the information, an information processing system that includes the information input device and the information output device, and a computer-readable recording medium that includes a computer program for the information processing system.

2. Description of the Related Art

In meetings and presentations, projectors that enlarge and project the content of information are used. In recent years, to enlarge and project the content of a display screen of an information input device such as a PC, a projector has increasingly been used with the information input device connected via a network in wired or wireless communications.

However, when establishing a connection between the information input device and the projector in a wired or wireless manner, it may sometimes be hard to connect. The cause thereof falls into several categories such as configuration settings and device settings but is difficult to isolate, and thus there are many cases that cannot be resolved. For this reason, projectors are recognized as hard-to-use. In particular, because the operation procedures and set-up procedures of devices are very cumbersome and complicated and are hard to understand, the connection with an information input device is considered to be difficult.

Consequently, disclosed is a conventional method in which a password is displayed on a screen of a projector, and by entering the password on a screen of a PC, a connection is easily achieved (For example, Japanese Patent No. 3707407).

In the above-described method, the password for communication to safely perform communication between the PC and the projector is entered. While a password is not normally disclosed considering a security aspect, the password is disclosed in this method because the projector is a device that is often used in a small space such as a meeting room.

However, even though it is used in a small space, this password is the information of a code used in communication connection, thereby causing a problem in that the security cannot be ensured.

SUMMARY OF THE INVENTION

It is an object of the present invention to at least partially solve the problems in the conventional technology.

According to the present invention, there is provided: an information input device that performs a process of transmitting information to an information output device to make the information output device output the information, the information input device comprising: a communication module configured to establish communication with one or more of such information output devices; an information acquiring module configured to acquire device information of the respective information output devices including an identification code used only for identifying each of the information output devices; an input receiving module configured to receive an entry of an identification code; and a device specifying module configured to search the device information acquired from the respective information output devices to specify the information output device to which the information is to be transmitted based on the identification code received, and give instructions to the communication module to transmit the information using the device information of the information output device specified.

The present invention also provides an information output device that performs a process of displaying information received from the above-described information input device, the information output device comprises: an identification code generator configured to generate an identification code that is used only for identifying the information output device using assignment information assigned to the information output device or input information entered; a communication module configured to transmit device information of the information output device including the identification code as a signal at a specific time interval, and establish communication with the information input device; and a display module configured to display the information received from the information input device by the communication module.

The present invention also provides an information processing system comprising: the above-described information input device; and one or more of such information output devices described above.

The present invention also provides a non-transitory computer-readable recording medium that contains a computer program readable by and executed by an information processing system including an information input device that includes a computer and transmits information and an information output device that outputs the information received, the computer program causing the computer included in the information processing system to execute: establishing communication between the information input device and one or more of such information output devices; acquiring device information of the respective information output devices including an identification code used only for identifying each of the information output devices; receiving an entry of an identification code; and searching the device information acquired from the respective information output devices to specify the information output device to which the information is to be transmitted based on the identification code received and transmitting the information to the information output device specified using the device information of the information output device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating an example of the configuration of an information processing system according to an embodiment;

DETAILED DESCRIPTION OF THE PREFERRED EMBODIMENT

Figure 2:
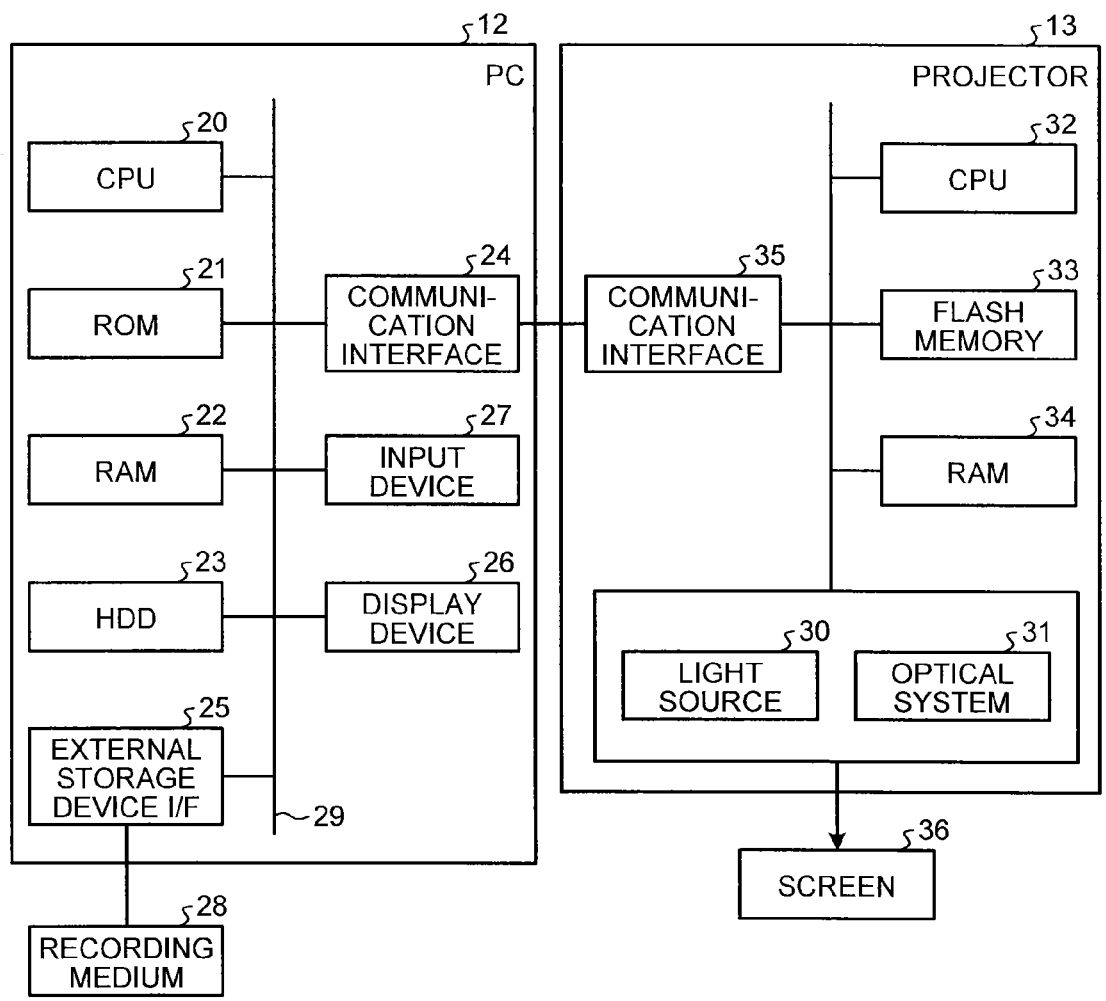
FIG. 2 is a block diagram illustrating the hardware configurations of an information input device and an information output device included in the information processing system illustrated in FIG. 1.

FIG. 1 is a diagram illustrating an example of the configuration of an information processing system according to an embodiment. The information processing system is configured to include one or more of information input devices 10, and one or more of information output devices 11. In FIG. 1, only one of the information input devices 10 and one of the information output devices 11 are indicated.

The information input device 10 is a device for entering therein information, and the number of the information input devices 10 in this system is not limited to one and two or more information input devices 10 can be provided. The information output device 11 is a device for outputting the information entered in the information input device 10, and two or more information output devices 11 can be provided.

The information input device 10 and the information output device 11 are operable to perform communication in a wired or wireless manner. When the communication is performed in a wired manner, the information input device 10 and the information output device 11 can be connected directly with a cable. Furthermore, the information input device 10 and the information output device 11 can be connected to a network such as a local area network (LAN) and the Internet using cables.

When the communication is performed in a wireless manner as illustrated in FIG. 1, a wireless LAN, Bluetooth®, and infrared communication can be adopted. In the wireless communications, a wireless LAN is generally adopted in consideration of its relatively wide communication area and security.

In a wireless LAN, there are two modes of an ad hoc mode in which the information input device 10 and the information output device 11 are connected directly to each other, and an infrastructure mode in which they are connected via an access point. Either one of these modes can be selected depending on whether a one-to-one connection is made or connections with a plurality of devices are made. An access point here is a radio device that is used when the connections to not only one device but other devices are made or when the connection to another network is made.

Furthermore, while a security measure by a network key and a security measure by encrypted communication such as WEP, WPA, and WPA2 are taken in a wireless LAN, these are generally known and are not described here in detail.

The information input device 10 may be any device as long as the entry of information can be performed thereon. The information input device 10 can include, for example, a PC, a tablet device, a smartphone, a personal digital assistant (PDA), a multi-function peripheral (MFP), and a game machine.

The information output device 11 may be any device as long as the device can receive the entry of information from the information input device 10 and output the information received. The information output device 11 can include, for example, a PC, a tablet device, a smartphone, a PDA, a projector, a television, a printer, a facsimile, a copying machine, and an MFP.

In FIG. 1, the information input device 10 and the information output device 11 are both configured in the ad hoc mode in a wireless LAN, and the information input device 10 and the information output device 11 perform wireless communications directly. The information that the information input device 10 transmits to the information output device 11 can include, for example, image information for each page of meeting material consisting of a plurality of pages. This is a mere example, and the information may be other information such as photographs and video pictures.

With reference to FIG. 2, the hardware configurations of the information input device 10 and the information output device 11 will be described. In the following description, the information input device 10 is described as a PC and the information output device 11 is described as a projector. The hardware configurations thereof are generally known, and thus they will be explained only briefly.

A PC 12 is configured to include, as hardware, a CPU 20, a ROM 21, a RAM 22, an HDD 23, a communication interface 24, an external storage device I/F 25, a display device 26, and an input device 27.

The CPU 20 controls various modules in the PC 12, and performs, for example, the calculation and processing of data. The various modules include the HDD 23, the communication interface 24, the external storage device I/F 25, the display device 26, the input device 27, and others. The CPU 20 receives data from the input device 27 and reads out software and data from the HDD 23, and then performs the calculation, processing, and such, and outputs the result to the display device 26, a projector 13, and others. The CPU 20 further performs a process of storing in the HDD 23.

The ROM 21 stores therein programs such as a basic input/output system (BIOS) that is executed at the start-up of the PC 12. The RAM 22 provides a storage area required for the CPU 20 to perform work. The HDD 23 stores therein applications, utility software, an OS, and the data relevant to the foregoing.

The applications and utility software are provided via a network not depicted or from a recording medium 28, and are stored in the HDD 23. The PC 12 includes the external storage device I/F 25 to make the PC 12 connectable to the recording medium 28. The recording medium 28 can include a CD-ROM, a DVD, an SD card, and others, and the external storage device I/F 25 can include a CD drive, a DVD drive, an SD card slot, and others that make the foregoing media readable and writable, respectively.

When the PC 12 is powered on, the PC 12 takes out the BIOS from the ROM 21 and executes it, and after checking that the HDD 23, the display device 26, the input device 27, and others are usable, reads out the OS from the HDD 23 to the RAM 22 and executes it to start up the PC 12. The PC 12 then executes, under the control of the OS, the applications and utility software to implement a desired process.

The communication interface 24 establishes connections with the projector 13, other PCs, other devices, and a network in a wired or wireless manner, and enables the communication to be performed with the foregoing. The display device 26 is a liquid crystal display or the like, and displays a display screen that the applications and utility software provide. The input device 27 is a keyboard, a mouse, and the like, and is used to enter characters or to select icons and others on the screen displayed on the display device 26. While the PC 12 here is configured with the display device 26 and the input device 27 as separate hardware, a device in which the foregoing are combined such as a touch panel can be used.

The CPU 20 and others are connected to a bus 29 as a transmission path for data and others, and are enabled to exchange the data and others with one another via the bus 29. The PC 12 can further include an interface, in which a cable such as a USB connection interface is connectable, so that the projector 13 and peripheral devices can be connected directly with cables.

The projector 13 is configured to include, as hardware, a light source 30, an optical system 31 including a projection lens, a CPU 32, a flash memory 33, a RAM 34, and a communication interface 35. While it is not included in the projector 13, the system further includes a screen 36 for projection.

The light source 30 and the optical system 31 are used to project information on the screen 36. While not depicted in FIG. 2, a control circuit to control the light source 30 and the optical system 31 is provided. The flash memory 33 stores therein, for example, a computer program required for the projector 13 to project the information received from the PC 12, setting values for various functions, and parameters for adjustments of hue, light intensity, and others.

The CPU 32 reads out the program to the RAM 34 and executes it to implement a process to generate a control signal and send it to the control circuit, a process to implement various functions using the setting values, and a process of hue adjustment and such using the parameters. This configuration is an example, and the PC 12 may be configured to include other circuits and sensors.

Figures 3, 4:
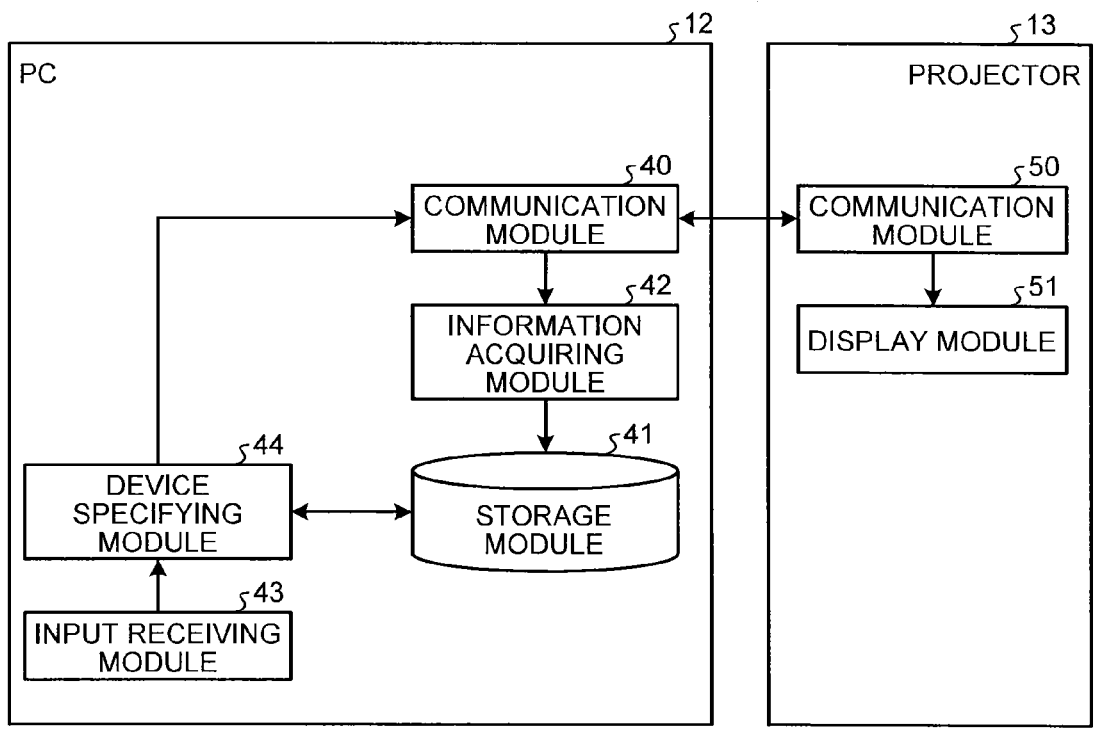
FIG. 3 is a functional block diagram illustrating one configuration of the information input device and the information output device illustrated in FIG. 2.
FIG. 4 is a table illustrating a list of device information held by the information input device illustrated in FIG. 3.

FIG. 3 is a functional block diagram illustrating one configuration of the PC 12 and the projector 13. The PC 12 is assumed to include, as one example of the configuration, a communication module 40, a storage module 41, an information acquiring module 42, an input receiving module 43, and a device specifying module 44.

The communication module 40 is implemented with the communication interface 24 illustrated in FIG. 2, and establishes the communication with one or more of the projectors 13. The communication module 40 can further establish the communication with other PCs and devices. The communication can be performed using an appropriate protocol, for example, TCP/IP.

The storage module 41 is implemented with the HDD 23, and stores therein a variety of data and others. The information acquiring module 42, the input receiving module 43, and the device specifying module 44 are implemented by the CPU 20 executing the program read out to the RAM 22 from the HDD 23. The information acquiring module 42 performs a process of acquiring device information of each of the projectors 13 including an identification code used only for identifying the respective projectors 13, and making the storage module 41 store therein the device information.

The identification code is used only for identifying each of the projectors 13, and thus is different from a device name, an IP address, a MAC address, and a password that are used for authentication, connection establishment, communication, and others. While the identification code may be any letters, symbols, numerals, or a combination of the foregoing, a number consisting of four digits can be given as one example. This is a mere example, and thus the identification code is not restricted to this.

The device information includes the identification code, and other than that, further includes the information, such as a projector name and an IP address of the projector 13, used at the time of establishing a connection and performing communication. The device information may further include the information of communication speed and others. The storage module 41 can store therein the device information of each of the projectors 13 acquired by the information acquiring module 42 in a list form.

The input receiving module 43 receives an entry of one identification code by a user. At this time, the input receiving module 43 can provide an entry screen to receive the entry. The input receiving module 43 is enabled, by the CPU 20 reading out the utility software to the RAM 22 and executing it, to provide the entry screen and to receive the entry of the identification code by the user.

The device specifying module 44, based on the identification code entered by the user, searches through each piece of the device information acquired from the respective projectors 13 and specifies the projector 13 to which the information is to be transmitted. At this time, the device specifying module 44 searches for the device information that includes the identification code matching the identification code received, and from the device information searched, acquires the information required for establishing a connection and performing communication such as a projector name and an IP address. The device specifying module 44 then gives instructions to the communication module 40 to transmit the information using the device information of the projector 13 specified, more specifically, the IP address and the projector name.

The communication module 40 transmits the output, i.e., the information to be displayed here, to the projector 13 specified by the device specifying module 44 using the device information of the projector 13.

The projector 13 is to include, as one example of the configuration, a communication module 50 and a display module 51. The communication module 50 is implemented with the communication interface 35, and transmits a signal (packets) including the device information in a broadcast mode at a specific time interval. When the PC 12 detects the signal, the PC 12 transmits the device information of its own to the communication module 50 and the communication module 50 then receives the device information, whereby the communication between the projector 13 and the PC 12 is established. The communication module 50 further receives, after the foregoing communication is established, the above-described information to be displayed from the PC 12.

The display module 51 displays the information received by the communication module 50 by projecting on the screen 36. The display module 51 is implemented with the light source 30, the optical system 31, the CPU 32, the flash memory 33, and the RAM 34, and after appropriate processing is performed on the information, projects the information on the screen 36. Examples of the processing include the hue adjustment, light intensity adjustment, and others in the foregoing.

FIG. 4 illustrates a list of device information stored in the storage module 41 included in the PC 12 illustrated in FIG. 3. In FIG. 4, the device information is acquired from two units of the projectors 13, and is in a list form. The two projectors 13 are defined by projector names as projector 01 and projector 02. The projector names are linked to IP addresses and identification codes. The IP addresses are defined as 111.111.111.111 and 222.222.222.222, and the identification codes are defined as 1111 and 2222, respectively.

While the list of device information is to include only the projector name, the IP address, and the identification code in this example, the list may include other information such as communication speed.

Figure 5:
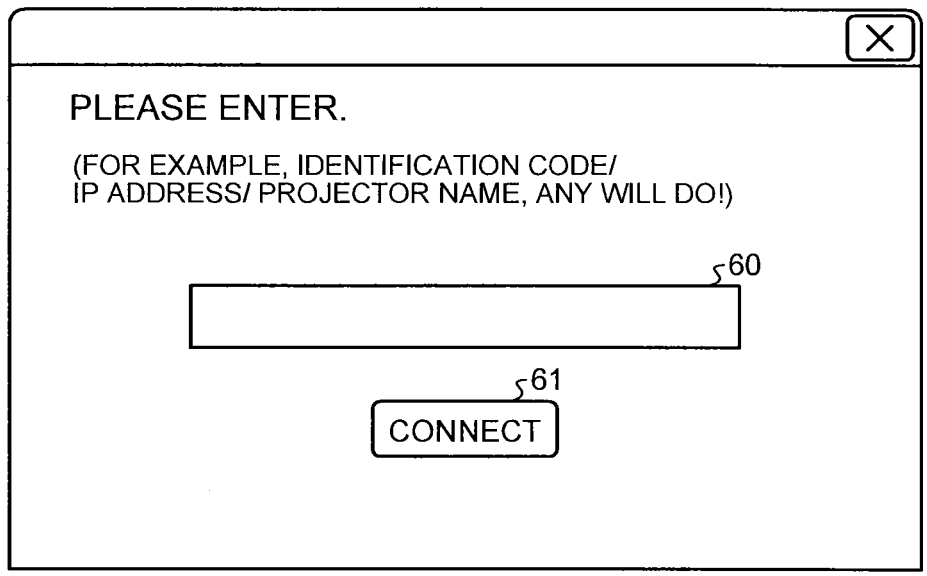
FIG. 5 is a diagram illustrating a screen displayed on a display device at the start-up of utility software.

FIG. 5 is a diagram illustrating an entry screen displayed on the display device 26 when the utility software is started up on the PC 12. While there are an ad hoc mode and an infrastructure mode in wireless communications, the entry screen as illustrated in FIG. 5 is displayed in either mode, prompting the user to enter an identification code. By the identification code entered, a connection is then established. Consequently, the entry of a password and such is unnecessary.

The entry screen is configured with only one entry window 60 for the user to enter using the input device 27, and one connect button 61 to perform connection. Consequently, eliminating other items to be entered can improve the operability. The items eliminated, for example, selection of the mode, are configured to be selected internally to reduce a burden on the user.

While a connection is to be established by entering an identification code here, it is also possible to establish the connection by entering a projector name or an IP address. This is because the storage module 41 holds, other than the identification codes, the IP addresses and the projector names as the device information as in the foregoing, and thus the connection can be established from these pieces of information.

When the storage module 41 further stores therein other information as the device information, the entry to be made on the entry screen may be the other information. This is because the connection can be established using the IP address and the projector name linked to the other information. As in the foregoing, the same entry method is adopted in either mode and the IP address and others can also be used for the entry, whereby unnecessary operations can be reduced and the operability can be improved.

Figure 6:
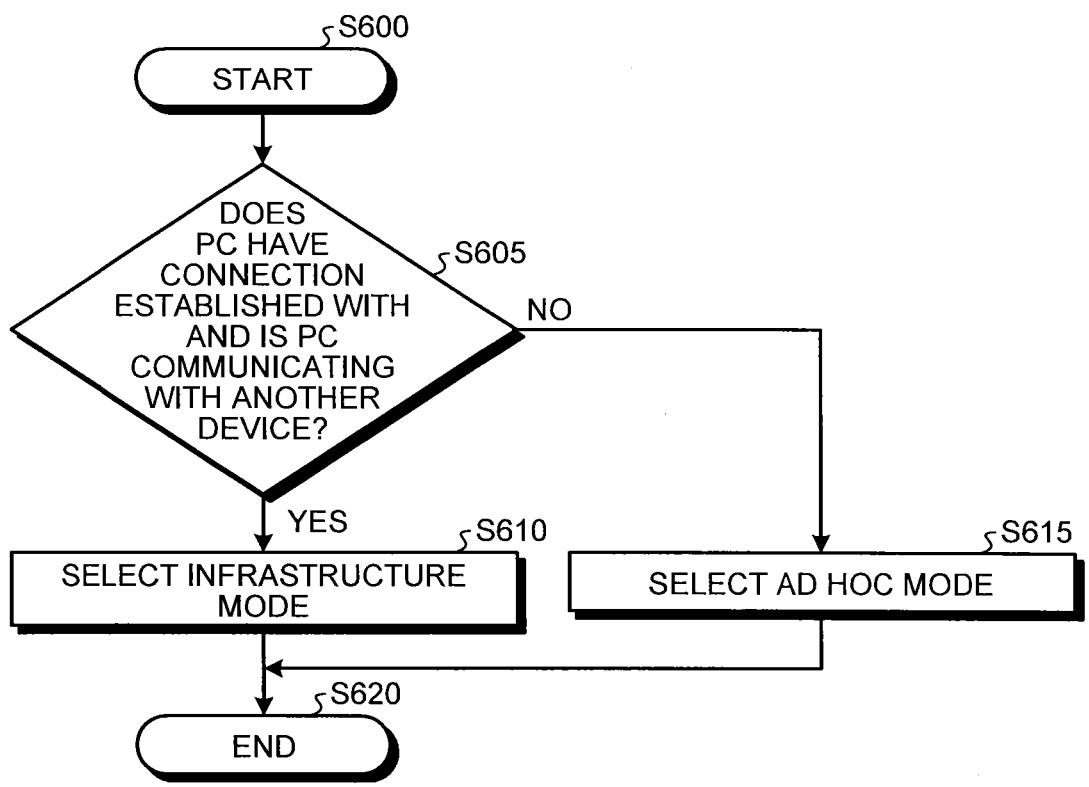
FIG. 6 is a flowchart illustrating a sequence of the process performed to internally select a connection method.

FIG. 6 is a flowchart illustrating a sequence of the above-described process performed to internally select a mode. When the user, using the input device 27, enters an identification code or others in the entry window 60 and then depresses the connect button 61, the process starts from Step S600.

At Step S605, the process determines whether or not the PC 12 has a connection established with and is performing communication with another device such as a PC and a projector other than the projector 13 identified by the identification code received.

When the PC 12 is performing the communication (YES at Step S605), the process advances to Step S610 and selects the infrastructure mode. This is to establish a new connection with the projector 13 corresponding to the identification code received while the communication with the other PC and such is continued.

In contrast, When the PC 12 is not performing the communication (NO at Step S605), the process advances to Step S615 and selects the ad hoc mode. This is because it only needs to establish the connection with only the projector 13 identified by the identification code received. After the selection of these modes, the process advances to Step S620 in either situation and ends the process.

Figure 7:
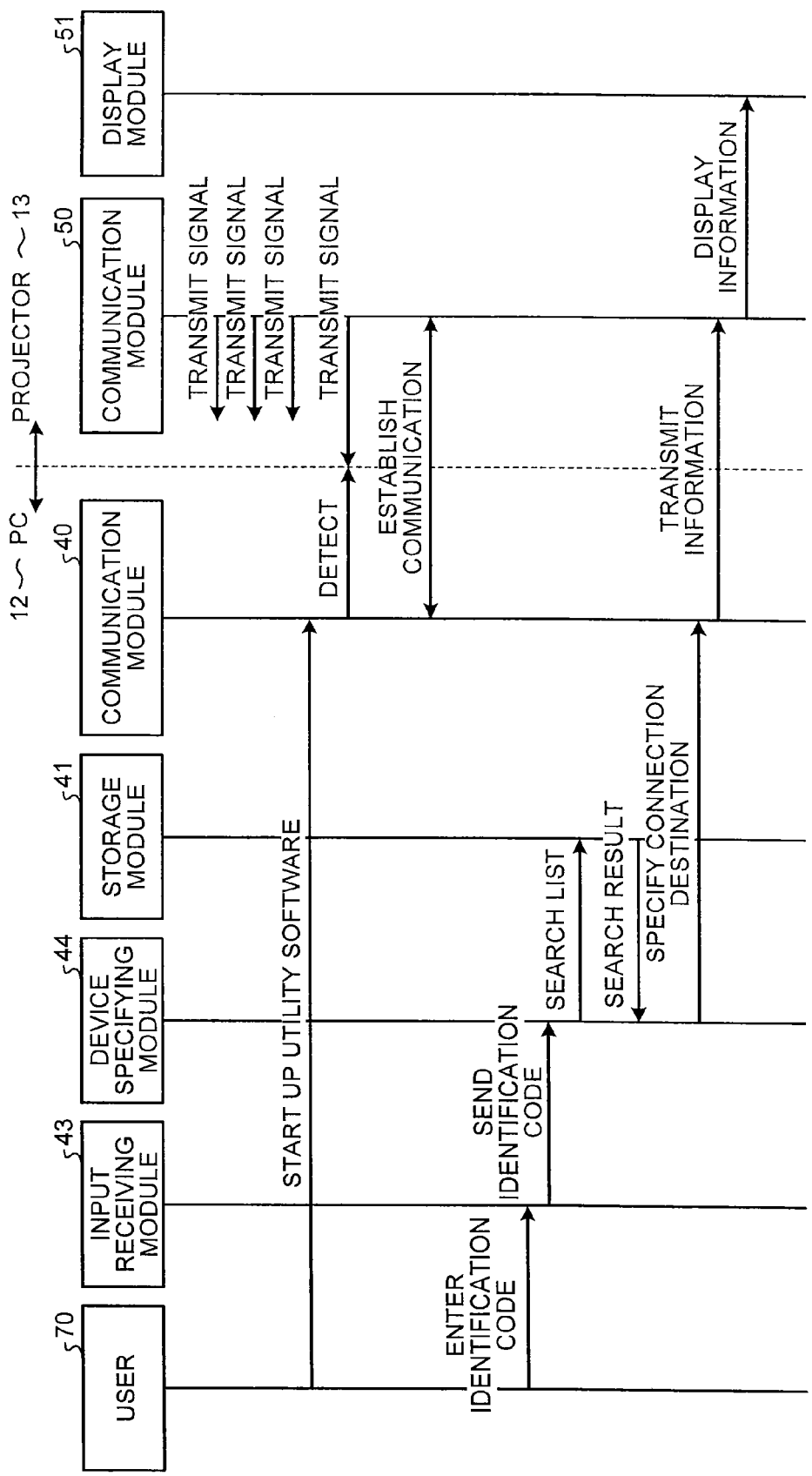
FIG. 7 is a sequence diagram illustrating a sequence of the process performed up to establishing a connection.

The sequence of the process performed by the various modules at this time will be described in detail with reference to the sequence diagram illustrated in FIG. 7. In FIG. 7, the information acquiring module 42 included in the PC 12 is omitted, and as there is an entry performed by the user, a user 70 is further indicated.

The communication module 50 of the projector 13 first transmits a signal including the device information in a broadcast mode at a specific time interval. The user 70 starts up the utility software on the PC 12 to transmit information to the projector 13 and make it display the information. By the start-up, the communication module 40 of the PC 12 detects the signal periodically transmitted by the projector 13 at the specific time interval. In FIG. 7, the PC 12 detects the signal at the fourth transmission from the projector 13.

The communication module 40 of the PC 12 detects signals from all of the projectors 13 present within a communication area in which radio waves reach, and the information acquiring module 42 not depicted acquires the device information and makes the storage module 41 store therein the device information in a list form. At this time, the PC 12 uses the IP address acquired from the projector 13 to transmit the device information including the IP address of the PC 12 itself and to establish the communication with the projector 13.

The input receiving module 43 presents an entry screen for identification code to the user 70, and receives an entry of an identification code by the user 70. The input receiving module 43 sends the identification code received to the device specifying module 44. The device specifying module 44 searches the list stored in the storage module 41, and as a result of the search, acquires the IP address and the projector name linked to the identification code. This specifies the projector 13 to which the information is to be transmitted.

The device specifying module 44 gives instructions to the communication module 40 to transmit the information to the projector 13 specified using the projector name and the IP address to make it display the information. The communication module 40 establishes a connection with the communication module 50 of the projector 13 using the projector name and the IP address. The communication module 40 then transmits the information to be displayed to the communication module 50, and the communication module 50 sends the information to the display module 51 to make it display the information by projecting on the screen 36.

When the user 70 enters an identification code, the user 70 needs to know what the identification code is like. However, it is difficult to memorize each of the identification codes for all of the projectors 13, and it is cumbersome and troublesome to write them all down on paper or the like. Consequently, as illustrated in FIG. 8, it can be configured to display, on the entry screen, the identification codes acquired at the time the communication is established, and to let the user 70 select and enter the identification code out of them.

Figure 8:
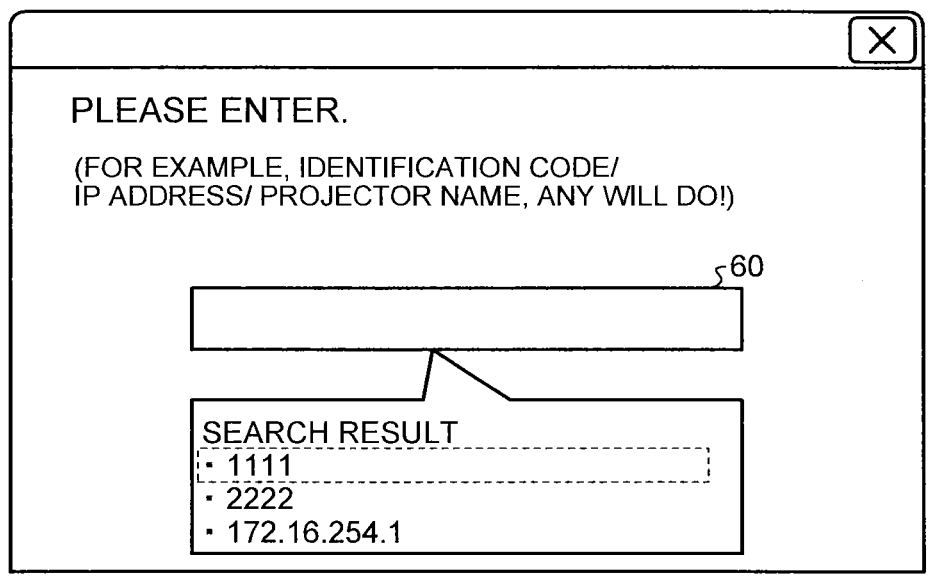
FIG. 8 is a diagram illustrating another example of the screen displayed on the display device at the start-up of the utility software.

FIG. 8 is a diagram illustrating another example of the entry screen displayed on the display device 26 at the start-up of the utility software on the PC 12. In FIG. 8, one entry window 60 and one connect button not depicted are provided. Furthermore, in the present embodiment, the identification codes included in the device information acquired from the projectors 13 that are present within the communication area are displayed, for example, in a balloon format. When the device information is acquired from a device not supporting the identification code, the device can be displayed with an IP address, a device name, or the like.

While it is configured that the identification codes are displayed in a balloon format and the user 70 is to enter an identification code while looking at the display, the embodiment is not restricted to this. For instance, it may be configured that, when the user 70 selects an identification code from the display with a mouse or the like, the identification code is entered into the entry window 60 automatically. Furthermore, the identification codes can be displayed, not in a balloon format, but in a combo box. This saves the user the trouble of entering the identification code, and thus can improve the operability.

As in the foregoing, when any of an identification code, an IP address, and a projector name is entered to specify a connection destination and to establish a connection, the projector name in the same format as that of the identification code or the IP address cannot be used. For example, when the projector name of an information output device is 111.111.111.111 and the IP address of another information output device is 111.111.111.111, it makes it no longer possible to specify which device to be the connection destination.

Figure 9:
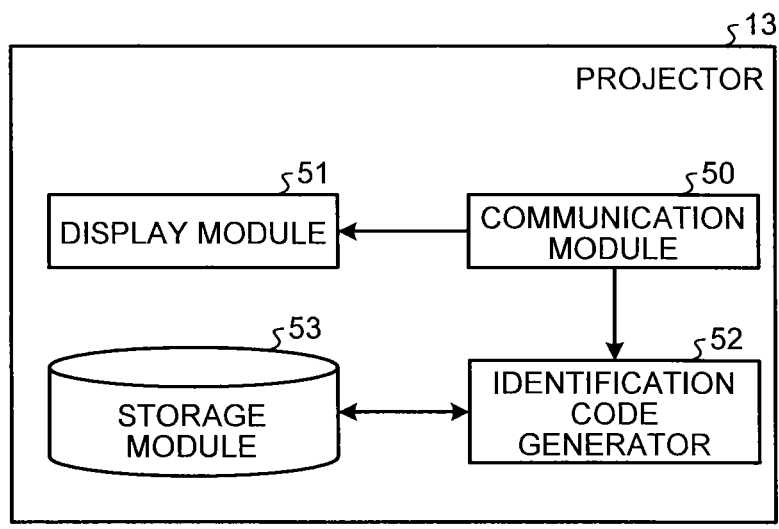
FIG. 9 is a functional block diagram illustrating another configuration of the information output device.
Figure 10:
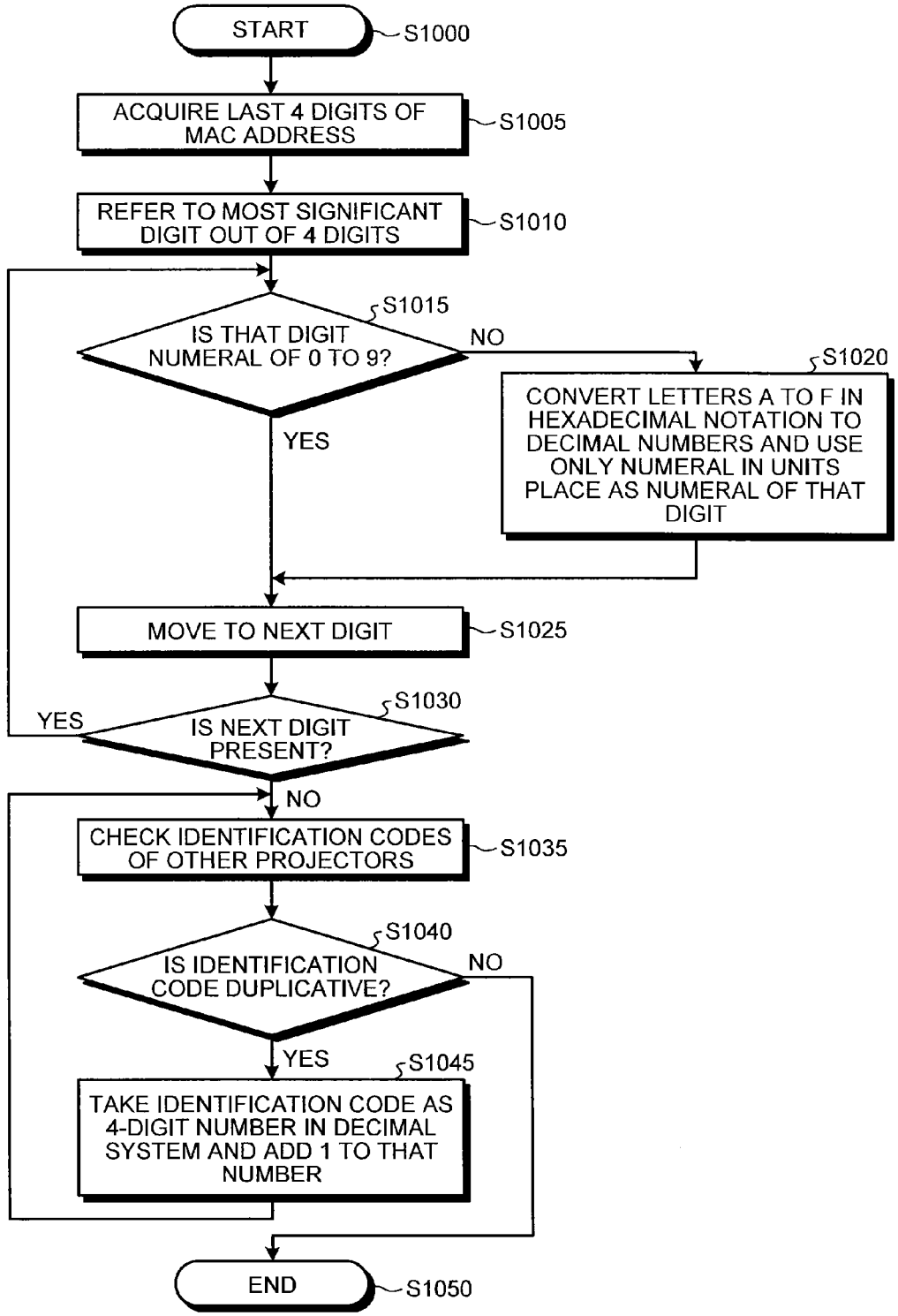
FIG. 10 is a flowchart illustrating a sequence of the process performed by an identification code generator illustrated in FIG. 9.

Next, the identification code will be described. The identification code is the identification information used only for identifying the projectors 13, and may be assigned in advance or may be configured to be generated automatically by each of the projectors 13. With reference to FIGS. 9 and 10, an example of the process in which the projector 13 automatically generates an identification code will be described. FIG. 9 is a functional block diagram illustrating an example of the configuration of the projector 13 that is capable of performing the process of automatically generating an identification code. Generating an identification code automatically saves the trouble of preparing the identification code.

The projector 13 is further configured to include, in addition to the communication module 50 and the display module 51, an identification code generator 52 and a storage module 53. The communication module 50 and the display module 51 have been described above, and thus the identification code generator 52 and the storage module 53 will be described here in detail.

The communication module 50 detects the signals transmitted from other projectors 13, establishes the communication, and acquires the device information of the other projectors 13. The communication module 50 then makes the storage module 53 store therein the identification codes included in the device information in a list form.

The identification code generator 52 generates an identification code using assignment information assigned to the device and held by itself such as a MAC address. The identification code generator 52 then compares the identification code generated with the list of identification code stored in the storage module 53 to check whether the identification code generated is the same. When the identification code is the same, the identification code generator 52 modifies the identification code generated and checks it again. By repeating this, the identification code generator 52 generates an identification code that is not duplicative of the identification codes held by the other projectors 13.

The identification code generated is sent to the communication module 50, and is used for the communication module 50 to periodically transmit a signal being included in the signal together with the IP address and the projector name.

With reference to FIG. 10, the sequence of the above-described process performed by the identification code generator 52 will be described in detail. FIG. 10 illustrates an example of generating an identification code using a MAC address.

The process starts from Step S1000, and at Step S1005, the process acquires the last four digits of the MAC address that the device itself holds. The MAC address is held by the communication interface 24 such as a network adaptor, and can be acquired from the communication interface 24. While the process here acquires the last four digits, it is not restricted as such and the process may acquire the first four digits and others.

At Step S1010, the process refers to the most significant digit out of the four digits acquired. When the last four digits are 5678, the process refers to the 5 of the most significant digit, and when the last four digits are FE45, the process refers to the F of the most significant digit. At Step S1015, the process determines whether or not the digit is a numeral of 0 to 9. When it is a numeral (YES at Step S1015) as in the former example, the process uses that numeral and advances to Step S1025 directly. When it is not a numeral (NO at Step S1015) as in the latter example, the process advances to Step S1020.

At Step S1020, when it is not a numeral, it can be considered as the letters A to F in hexadecimal notation. Thus, the process converts these letters to decimal numbers, and uses only the numeral in the units place as the numeral of that digit. The A to F are converted to 10 to 15 when converted into decimal system. Because it is the F in the latter example, the process converts the F to 15 in decimal system and uses the 5 in the units place. The process then advances to Step S1025.

At Step S1025, the process moves to the next digit. At Step S1030, the process determines whether or not the next digit is present. When the next digit is present (YES at Step S1030), the process returns to Step S1015 and determines whether or not the digit is a numeral again. When the next digit is not present (NO at Step S1030), the process advances to Step S1035 and refers to the list stored in the storage module 53 so as to check the identification codes held by the other projectors 13 that are present within the communication area.

At Step S1040, the process determines whether or not the identification code generated as a code consisting of a 4-digit number, for which the numerals for the respective digits are determined, is duplicative of the identification codes in the list. When the identification code is duplicative (YES at Step S1040), the process advances to Step S1045, takes the identification code as a 4-digit number in decimal system, and defines a 4-digit number obtained by adding one to the 4-digit number as an identification code. The process then returns to Step S1035 and checks the identification code again.

For instance, when the identification code generated is 4567 and is determined to be duplicative, the process defines a number 4568 obtained by adding one to the 4-digit number as a modified identification code. The processing between Step S1035 and Step S1045 is repeated until the identification code is no longer duplicative.

In contrast, when the identification code is not duplicative (NO at Step S1040), the process advances to Step S1050, transfers the identification code to the communication module 50 to be used as the identification code of the projector 13, and ends the process.

Figure 11:
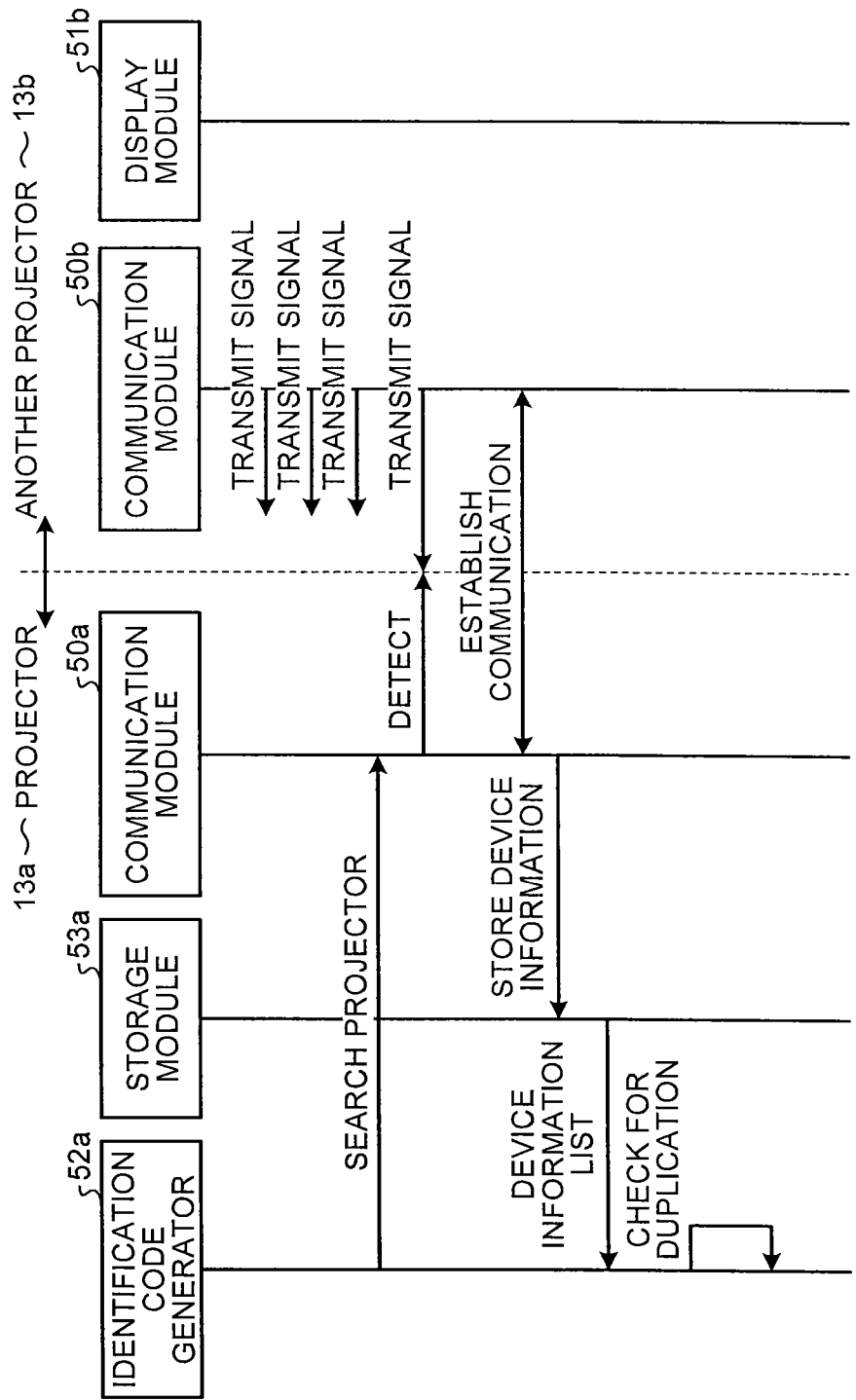
FIG. 11 is a sequence diagram illustrating a sequence of the process performed by the various modules illustrated in FIG. 3.

The sequence of the process performed in the various modules at this time will be described with reference to the sequence diagram illustrated in FIG. 11. It is assumed that one projector 13a includes a communication module 50a, an identification code generator 52a, and a storage module 53a, and another projector 13b includes a communication module 50b, a display module 51b. While only the other projector 13b is illustrated here, several other projectors 13 may further be present.

First, the communication module 50b of the projector 13b transmits a signal including the device information in a broadcast mode at a specific time interval. At any time, the identification code generator 52a of the projector 13a gives instructions to the communication module 50a to detect the signal transmitted. The foregoing time may be any time as it is arbitrary.

The communication module 50a detects the signals from all of the projectors 13 that are present within the communication area including the projector 13b. At this time, the projector 13a uses an IP address and others acquired from each of the projectors 13 to transmit the device information including the IP address of its own, and establishes the communication with the respective projectors 13. The communication module 50a then acquires the device information of the respective projectors 13, and makes the storage module 53a store therein the device information in a list form.

The identification code generator 52a compares the identification code generated itself with the list of device information stored in the storage module 53a one by one to check whether or not the identification code generated is duplicative. When the identification code is duplicative, the identification code generator 52a modifies the identification code in a manner described above. The identification code generator 52a then repeats the check and modification of the identification code until the code is no longer duplicative.

Figure 12:
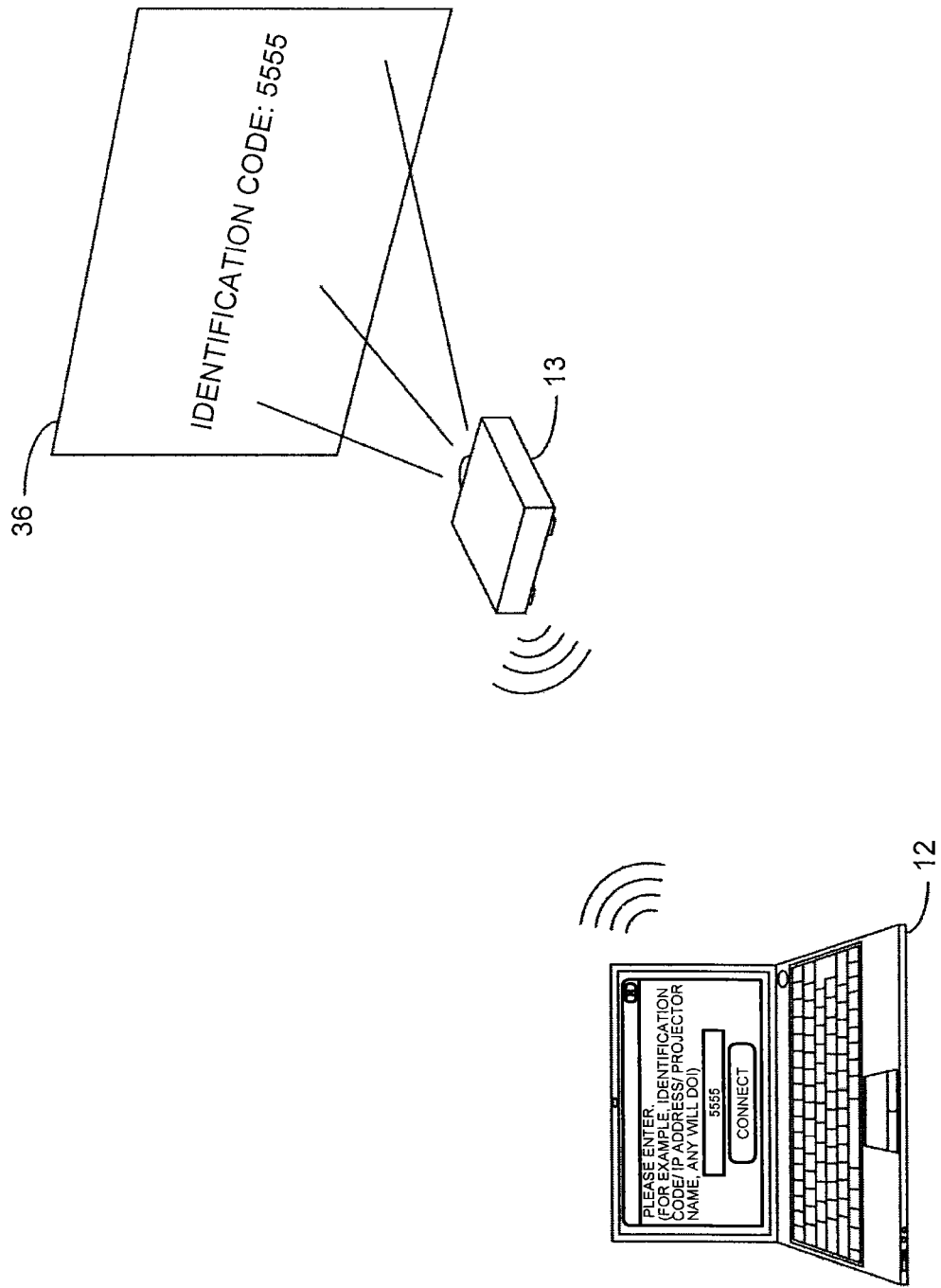
FIG. 12 is a diagram illustrating a situation of the information output device projecting an identification code.

While the identification code can be displayed in a balloon format on the entry screen for the user, other than that, the projector 13 can be made to display the identification code held by itself. As illustrated in FIG. 12, the projector 13 is made to display an identification code 5555 on the screen 36, and when the user enters the identification code on the PC 12, the user can enter it while looking at the display. By the entry, the projector 13 can be made to display the information that the user desired on the screen 36. This enables the user to determine the projector 13 to which the user wants to project by looking at the screen.

While the identification code can be generated automatically from the MAC address as in the foregoing, it is also possible to use an appropriate 4-digit number, which is entered by the user himself/herself as input information, as an identification code. Consequently, the projector 13 can further include an input receiving module that receives the entry of the identification code. This enables the user to create a favorite code.

At this time, an identification code that is to identify only the projector 13 can be generated by determining whether or not the identification code is duplicative of the identification codes held by the peripheral projectors 13, and when the identification code is duplicative, by modifying the identification code until the identification code is no longer duplicative.

In the foregoing, the process of transmitting the information held by the PC 12 to the projector 13 specified to make it display the information has been described. The information, however, is not restricted to the information held by the PC 12, and the information may be held by a server and others connected to the PC 12. Thus, the server and others can hold an identification code, and the connection can be established using the identification code.

Figure 13:
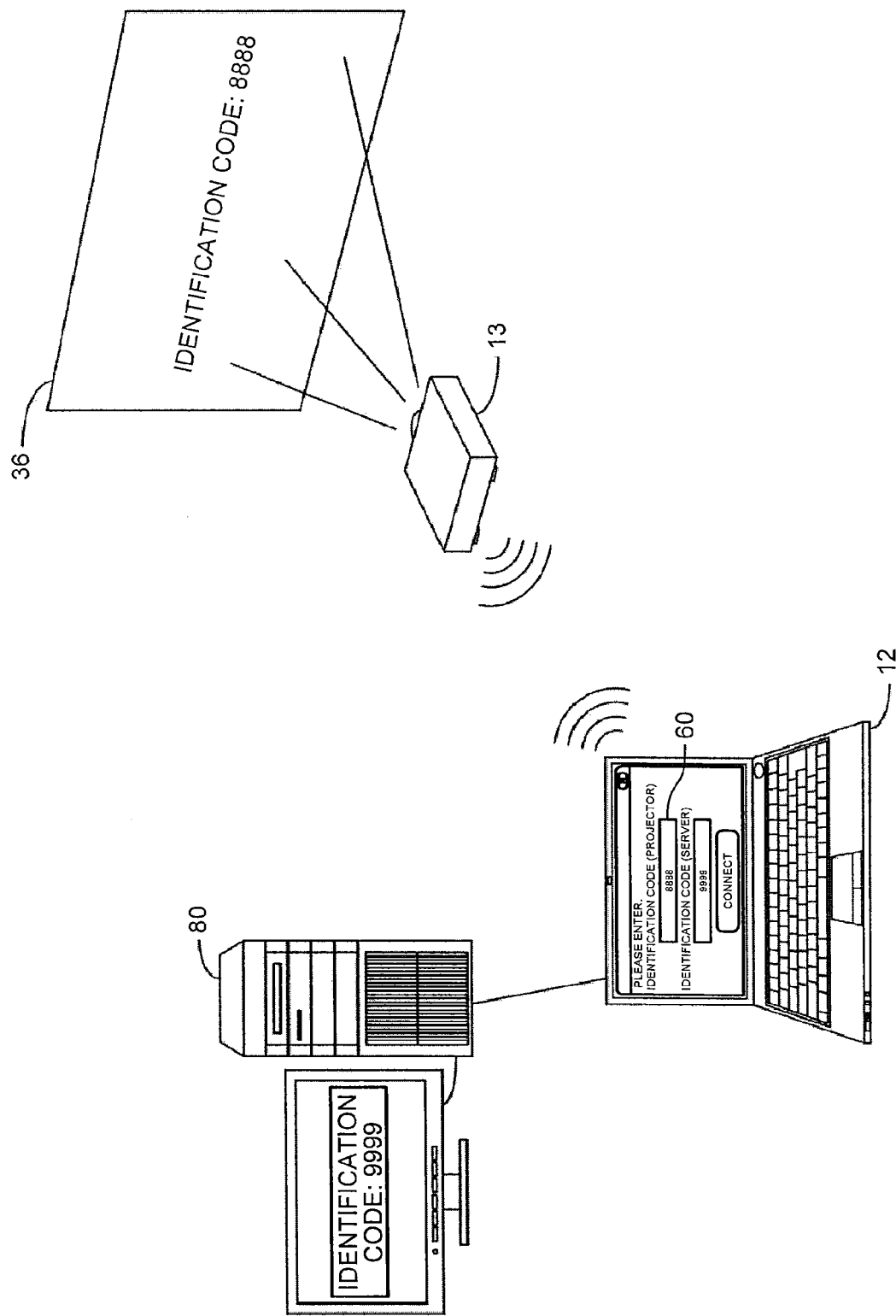
FIG. 13 is a diagram illustrating screens displayed on the various devices.
Figure 14:
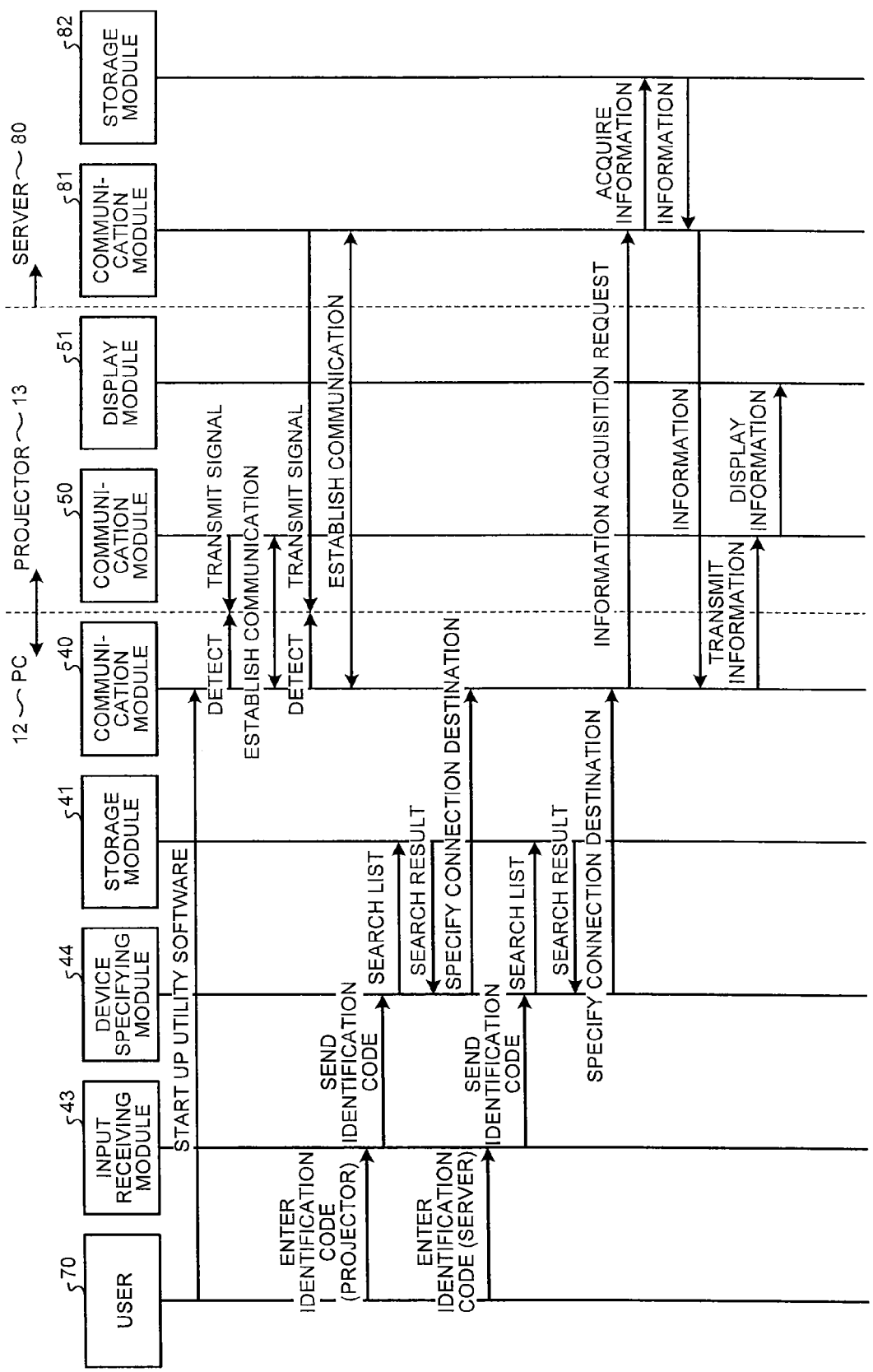
FIG. 14 is a sequence diagram illustrating a sequence of the process performed by the various modules in the example illustrated in FIG. 13.

With reference to FIGS. 13 and 14, the configuration and the process performed in this situation will be described in detail. The projector 13 displays the own identification code, and a server 80 also displays the own identification code. The server 80 includes a display device and can display the own identification code on the display device.

While it is configured that the PC 12 and the server 80 are connected with a cable or the like and the PC 12 and the projector 13 are to perform wireless communications in FIG. 13, it is not restricted to this. The PC 12 and the server 80 may be connected via a network, or may be connected via a wireless LAN through an access point. Furthermore, the PC 12 and the projector 13 may be connected in a wired manner using a cable.

When the PC 12 starts up the utility software, the PC 12 displays an entry screen having two entry windows 60 as illustrated in FIG. 13 prompting the identification codes for the projector 13 and for the server 80 to be entered, and is ready to receive the entries thereof.

To yield this process, as illustrated in FIG. 14, it is assumed that the PC 12 includes the communication module 40, the storage module 41, the input receiving module 43, and the device specifying module 44, and the projector 13 includes the communication module 50 and the display module 51. It is further assumed that the server 80 includes a communication module 81, and a storage module 82 to store therein information. This is a mere example, and the foregoing devices may include other functional modules.

As illustrated in FIG. 14, the user 70 first starts up the utility software on the PC 12 to detect the signals transmitted by the projector 13 and the server 80, and to establish the communication with the projector 13 and with the server 80.

The user 70 enters the identification code for the projector 13, and the input receiving module 43 receives the entry. The identification code received is sent to the device specifying module 44, and the device specifying module 44 refers to the list stored in the storage module 41 to search for the same identification code. The device specifying module 44 specifies the projector 13 having the projector name linked to the identification code searched, and establishes the connection for which the connection destination is the projector 13 using the IP address.

Furthermore, the user 70 enters the identification code for the server 80, and the input receiving module 43 receives the entry. The identification code received is sent to the device specifying module 44, and the device specifying module 44 refers to the list stored in the storage module 41 to search for the same identification code. The device specifying module 44 specifies the server 80 having a server name linked to the identification code searched, and establishes the connection for which the connection destination is the server 80 using the IP address.

The communication module 40 of the PC 12 then transmits an information acquisition request to the communication module 81 of the server 80. The communication module 81 reads out the information that is stored in the storage module 82 and corresponds to the request, and transmits the information to the communication module 40. The communication module 40 receives the information, and transmits the information to the communication module 50 of the projector 13 specified earlier. The communication module 50 then gives instructions to the display module 51 to make it display the information by projecting on the screen 36.

In short, this process is for the PC 12, in response to receiving the entry of the identification code for the server 80 and the entry of the identification code for the projector 13, to receive information provided from the server 80 and to transmit the information to the projector 13 to be displayed.

Figure 15:
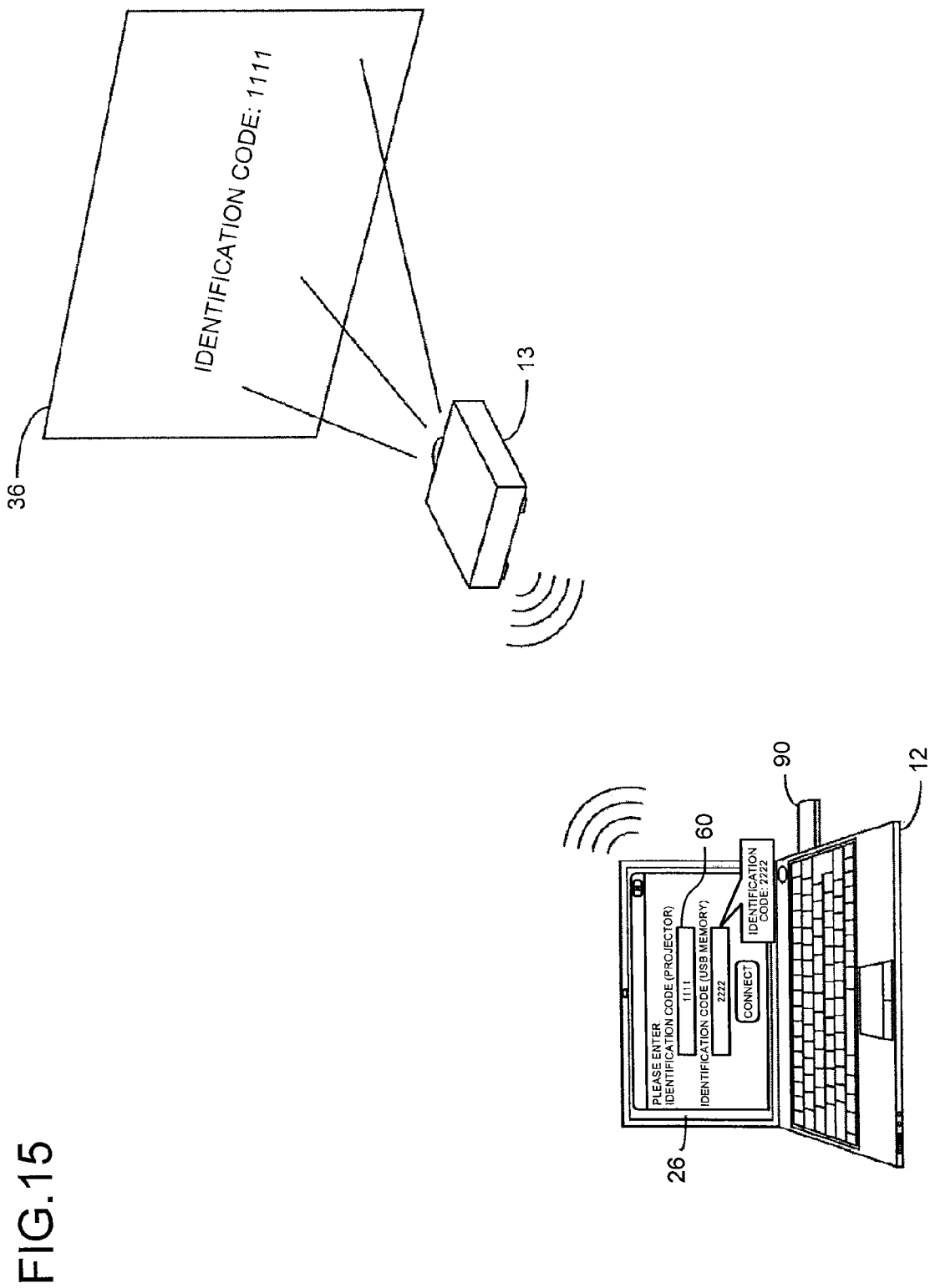
FIG. 15 is a diagram illustrating an example of the use of a USB memory as a storage medium.
Figure 16:
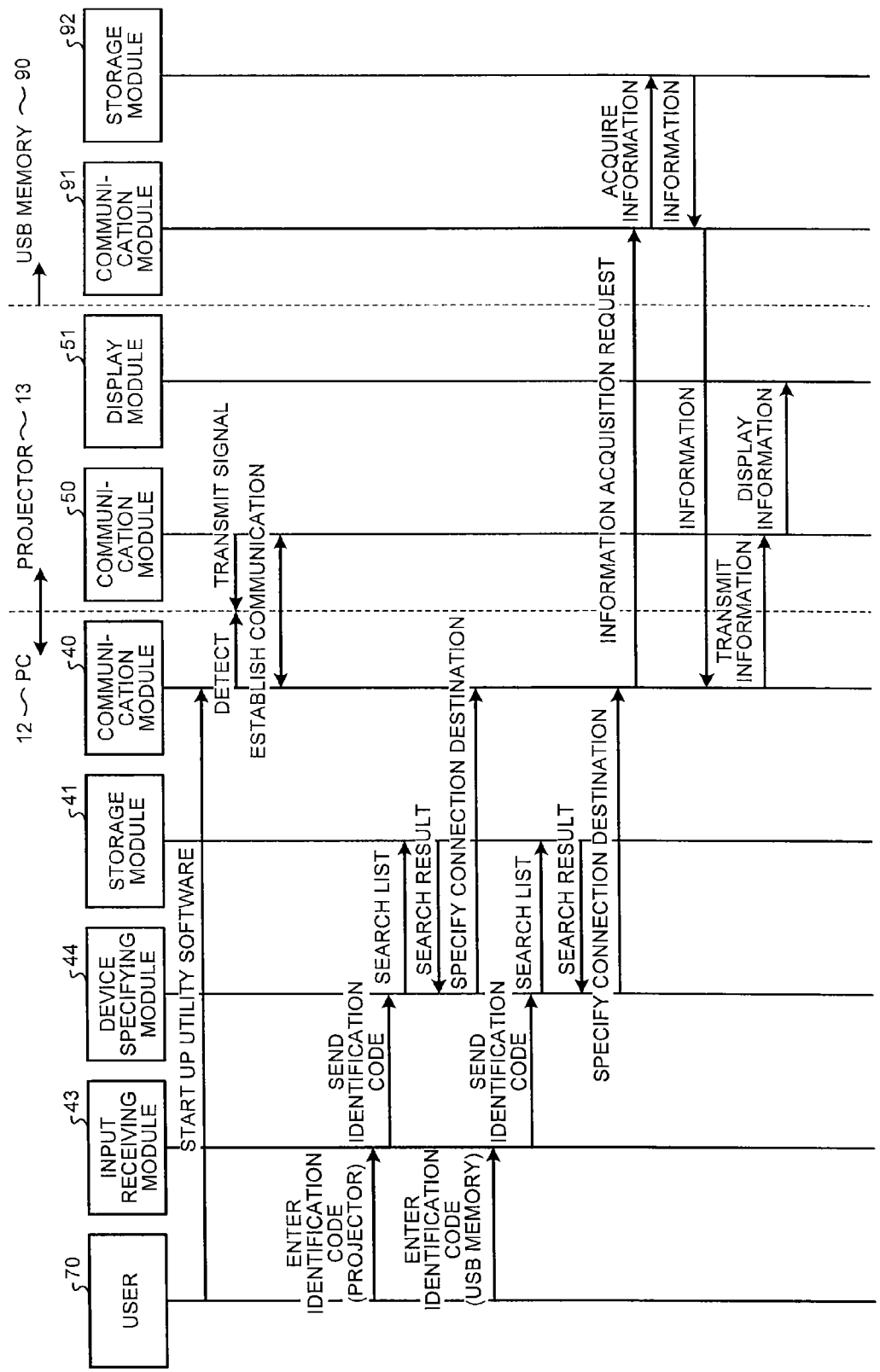
FIG. 16 is a sequence diagram illustrating a sequence of the process performed by the various modules in the example illustrated in FIG. 15.

While the above-described example illustrates that the information to be displayed is provided by the server 80, the information is not restricted to be provided by the server 80. The information may be stored in a recording medium such as a CD-ROM, a DVD, an SD card, a USB memory, and others, and the information can then be read out from the recording medium and displayed. With reference to FIGS. 15 and 16, an example of this situation will be described in detail.

FIG. 15 is a view illustrating an example of the use of a USB memory as a storage medium. In FIG. 15, a USB memory 90 is used in place of the server 80 illustrated in FIG. 13. The projector 13 displays the own identification code, and the USB memory 90 also displays the own identification code in a balloon format or the like. The display in a balloon format can be displayed on the display device 26 of the PC 12 together with the entry screen.

When the PC 12 starts up the utility software, the PC 12 displays a screen having two entry windows 60 as illustrated in FIG. 15 prompting the identification codes for the projector 13 and for the USB memory 90 to be entered, and is ready to receive the entries thereof.

To yield this process, as illustrated in FIG. 16, it is assumed that the PC 12 includes the communication module 40, the storage module 41, the input receiving module 43, and the device specifying module 44, and the projector 13 includes the communication module 50 and the display module 51. The USB memory 90 is assumed to include a communication module 91, and a storage module 92 to store therein information. This is a mere example, and the foregoing devices may include other functional modules.

As illustrated in FIG. 16, the user 70 first starts up the utility software on the PC 12 to detect the signal transmitted by the projector 13, and to establish the communication with the projector 13. The PC 12 further detects that the USB memory 90 is mounted thereto.

The user 70 enters the identification code for the projector 13, and the input receiving module 43 receives the entry. The identification code received is sent to the device specifying module 44, and the device specifying module 44 refers to the list stored in the storage module 41 to search for the same identification code. The device specifying module 44 specifies the information output device 11 having the projector name linked to the identification code searched, and establishes the connection for which the connection destination is the projector 13 using the IP address.

The user 70 enters the identification code for the USB memory 90, and the input receiving module 43 receives the entry. The identification code received is sent to the device specifying module 44, and the device specifying module 44 refers to the list stored in the storage module 41 to search for the same identification code. The device specifying module 44 specifies the USB memory 90 having a USB memory name linked to the identification code searched, and establishes the connection for which the connection destination is the USB memory 90.

The communication module 40 of the PC 12 then transmits an information acquisition request to the communication module 91 of the USB memory 90. The communication module 91 reads out the information that is stored in the storage module 92 and corresponds to the request, and transmits the information to the communication module 40. The communication module 40 receives the information, and transmits the information to the communication module 50 of the projector 13 specified earlier. The communication module 50 then gives instructions to the display module 51 to make it display the information by projecting on the screen 36.

This process is for the PC 12, in response to receiving the entry of the identification code for the USB memory 90 and the entry of the identification code for the projector 13, to receive information provided from the USB memory 90 and to transmit the information to the projector 13 to be displayed.

The two situations of the identification code being generated automatically from the MAC address and the identification code being entered by the user have been described. Other than that, the identification code can also be generated from a production number. While the method of automatically generating an identification code from a production number will be described later, the process of selecting one out of the foregoing options and generating an identification code by the method selected will be described here.

Figure 17:
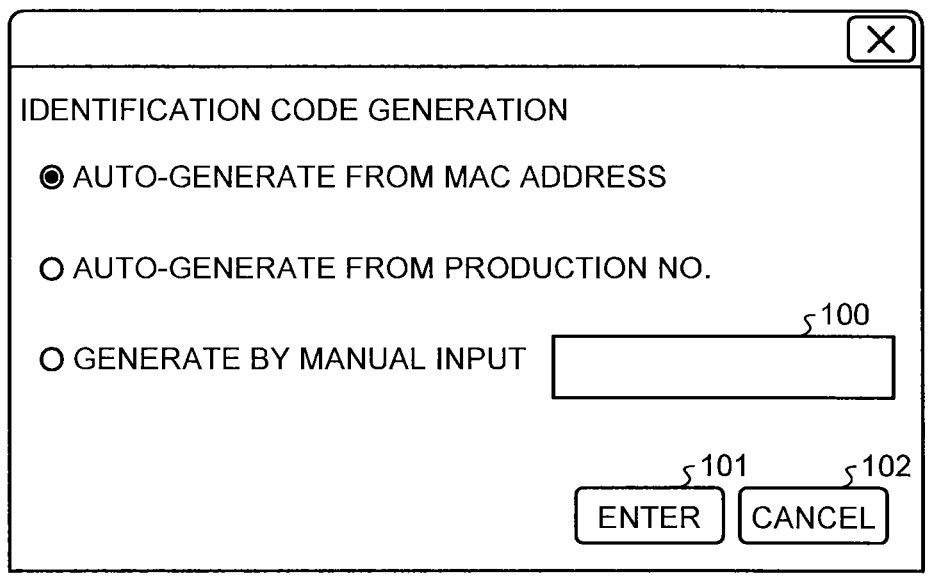
FIG. 17 is a diagram illustrating a screen to select a method of identification-code generation.

The projector 13 can display a screen as illustrated in FIG. 17 for the generation of an identification code. In FIG. 17, three options of Auto-Generate from MAC Address, Auto-Generate from Production number (Production No.), and Generate by Manual Input are available to select for the generation of an identification code. Provided further is an entry window 100 to enter when Generate by Manual Input is selected. Furthermore, an enter button 101 to determine the selection and a cancel button 102 to cancel the selection are also provided.

In FIG. 17, Auto-Generate from MAC Address is selected, and it is configured that depressing the enter button 101 automatically generates an identification code by the method selected. While only three options are illustrated here, it is possible to include other options that can generate an identification code.

Figure 18:
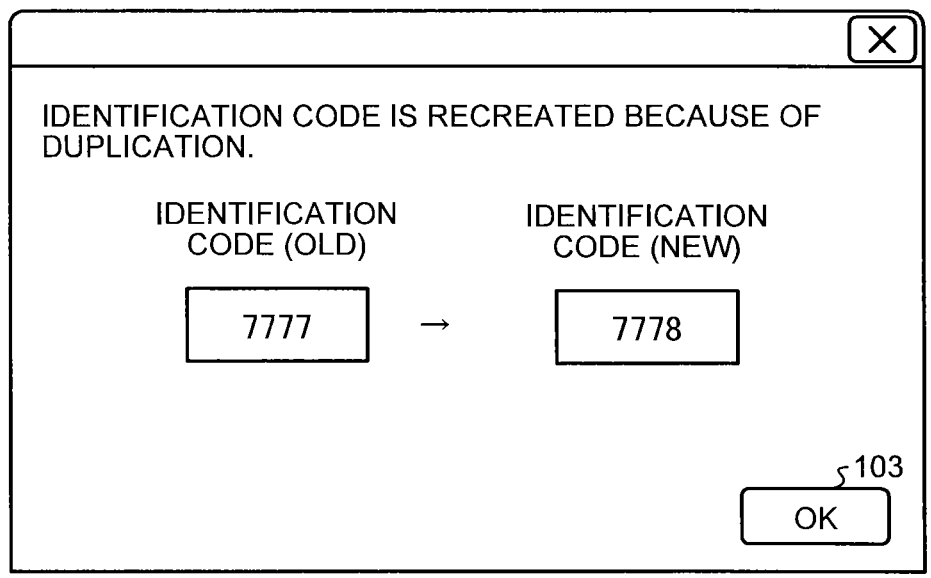
FIG. 18 is a diagram illustrating a screen displayed when the identification code is duplicative.

FIG. 18 is a diagram illustrating a screen displayed when an identification code is duplicative of those of the other projectors 13 while the identification code is generated. The screen is a mere example, and thus it is not restricted to this. As illustrated in FIG. 10, when an identification code generated is duplicative of those of the other projectors 13, the identification code is modified by adding one to the identification code as a 4-digit number to automatically generate an identification code that is not duplicative.

Consequently, as illustrated in FIG. 18, it can be displayed that the identification code is recreated because of the duplication of identification code, the identification code first created, and the identification code recreated. These can be achieved by a notifying module separately provided. In FIG. 18, an OK button 103 is further displayed, and depressing the OK button 103 can settle the identification code recreated as the identification code of the projector 13.

Figure 19:
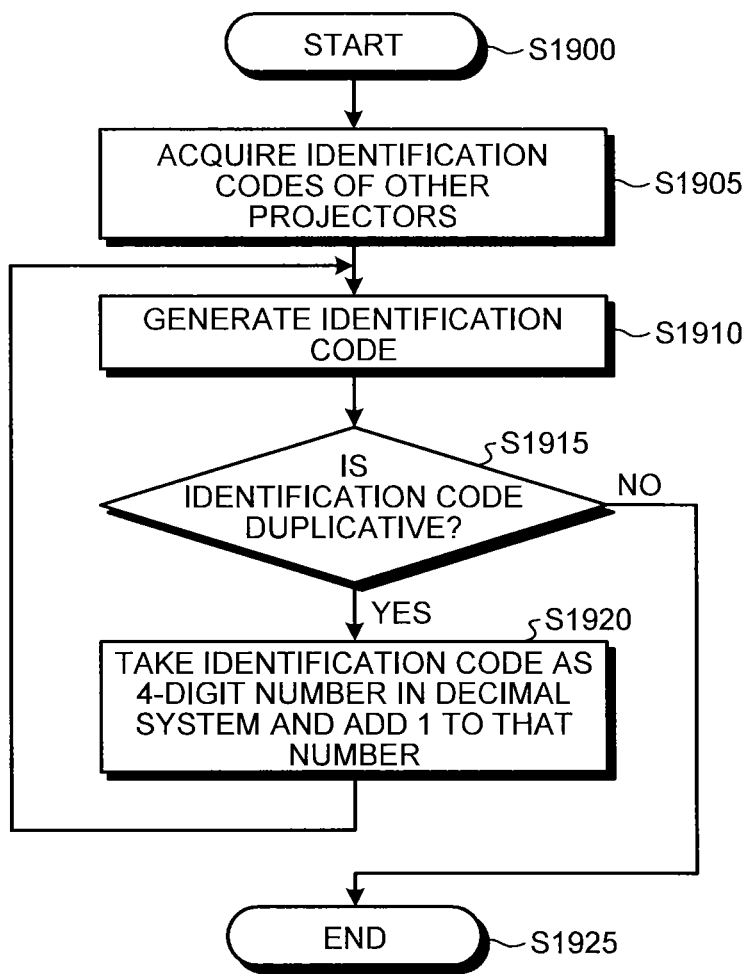
FIG. 19 is a flowchart illustrating a sequence of the process performed, by selecting a method of identification-code generation, to generate an identification code by the method of identification-code generation selected.

The process of selecting a method of generating an identification code, and generating the identification code by the method selected will be described in detail with reference to the flowchart illustrated in FIG. 19. The process starts from Step S1900. At Step S1905, the process first acquires the identification codes from the other projectors 13 present within the communication area. The other projectors 13 also transmit the signal including the device information at a specific time interval, and by detecting the signals, the projector 13 that performs this process can acquire the identification codes of the other projectors 13.

At Step S1910, the process makes the storage module 53 store therein the identification codes acquired as a list, and in the meantime, the process generates an identification code based on the method selected by the user. At Step S1915, the process determines whether or not the identification code generated is duplicative of any of the identification codes in the list stored in the storage module 53.

When it is duplicative (YES at Step S1915), the process advances to Step S1920, and adds one to the identification code as a 4-digit number in decimal system to modify the identification code. The process then returns to Step S1915 and determines whether or not the identification code is duplicative again. In contrast, when it is not duplicative (NO at Step S1915), the process advances to Step S1925, settles the identification code as the identification code of the projector 13, and ends the process.

This identification code is included in the device information together with the IP address and the projector name, and the signal containing the device information is periodically transmitted at a specific time interval by the communication module 50.

On the screen illustrated in FIG. 18, the identification code is automatically generated and the result thereof is displayed. Such a display can be made when the identification code is set to be generated automatically. The user can set the identification code not to be generated automatically. In this case, as shown in FIG. 19, when the identification code is duplicative (YES at Step S1915), a screen can be displayed to confirm whether or not to recreate the identification code.

Figure 20:
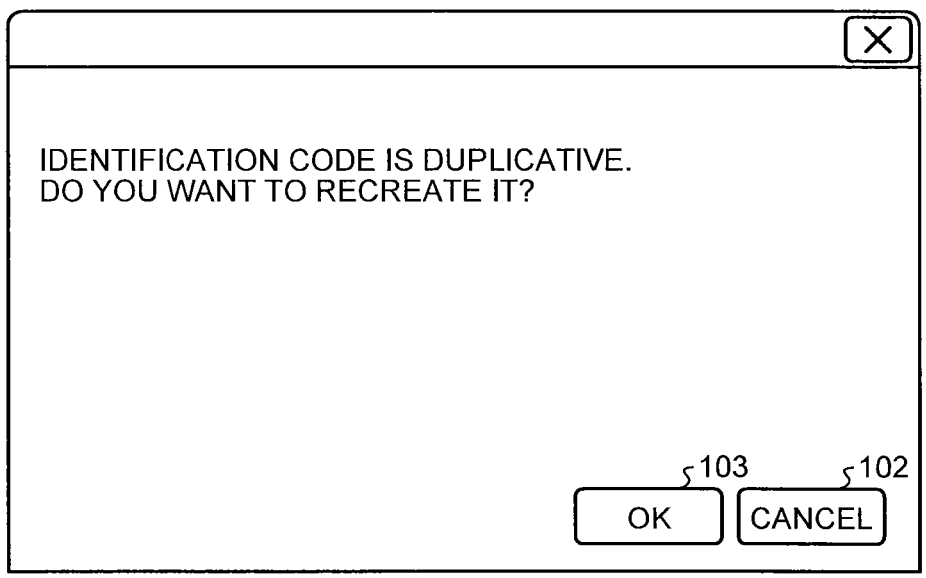
FIG. 20 is a diagram illustrating another example of the screen displayed when the identification code is duplicative.

FIG. 20 is a diagram illustrating an example of the confirmation screen, and the screen shows that the identification code is duplicative and asks whether or not to recreate it. The user can depress the OK button 103, when recreate it, to make the process recreate the identification code, or can depress the cancel button 102 to end the identification code generation process in a condition of the identification code not being recreated. Consequently, incorrect projection can be prevented.

Figure 21:
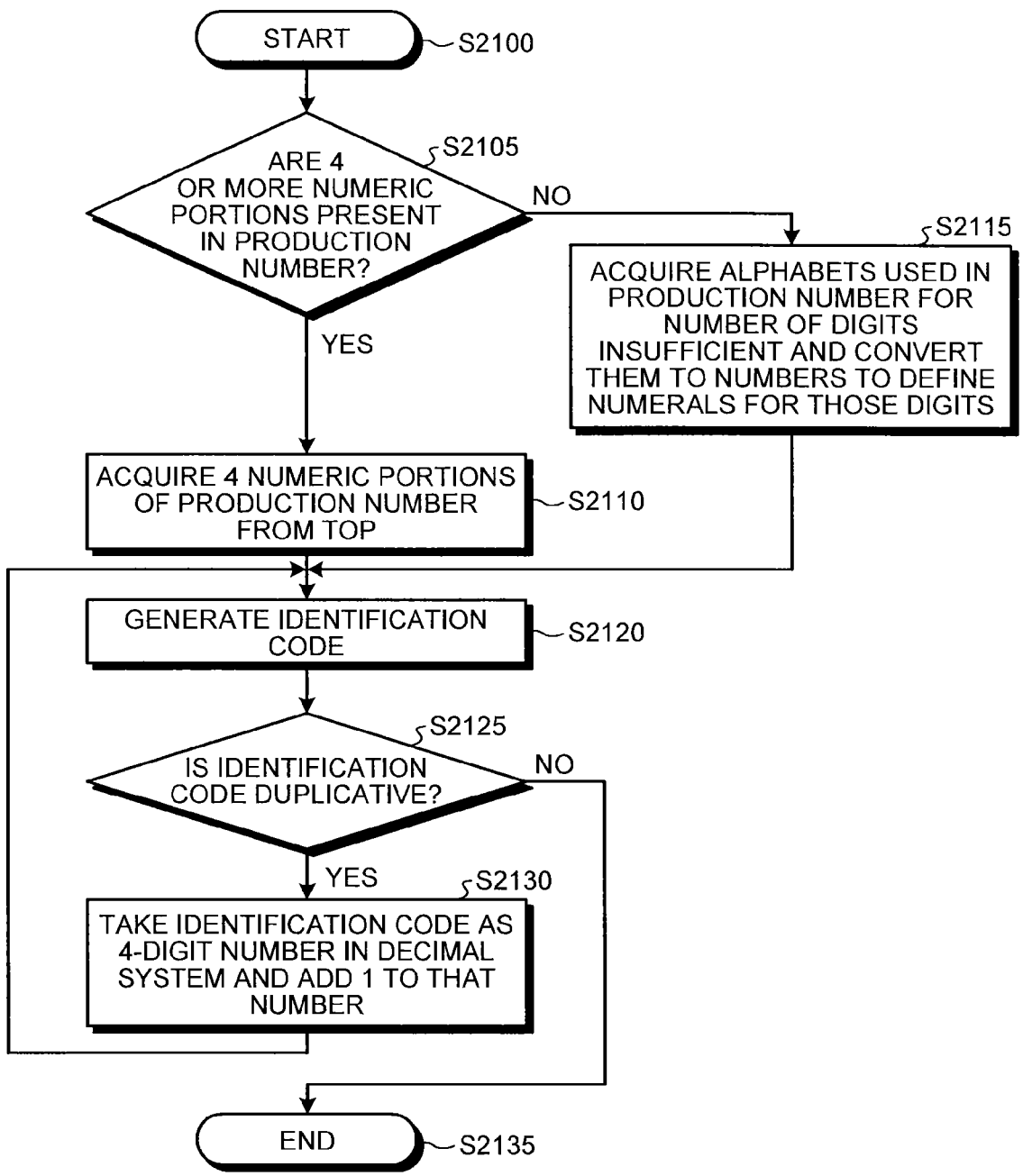
FIG. 21 is a flowchart illustrating a sequence of the process performed to automatically generate an identification code from a production number.

Now, with reference to FIG. 21, the earlier mentioned process of automatically generating an identification code from a production number will be described in detail. The production number is a series of numbers numbered to products shipped, and is also referred to as a serial number (S/N). The serial number is stored in the flash memory 33, and can be acquired from reading it out from the flash memory 33.

This process starts from Step S2100, and at Step S2105, the process determines whether or not four or more numeric portions are present in the production number acquired. Suppose that the production number is SB4H5Y6N7M8XHJ9Q, six numeric portions of 4, 5, 6, 7, 8, and 9 are present, and thus the process determines that four or more numeric portions are present. In contrast, as in the production number of SB4H5Y6MMRYHJQQ, when there are only three numeric portions of 4, 5, and 6, the process determines that four or more numeric portions are not present.

When four or more numeric portions are present (YES at Step S2105), the process advances to Step S2110, and acquires four numeric portions of the production number from the top. With the former example above, the process acquires 4, 5, 6, and 7 that are the four numeric portions of 4, 5, 6, 7, 8, and 9 from the top. In contrast, When there are three or less numeric portions (NO at Step S2105), the process advances to Step S2115.

At Step S2115, the process acquires alphabets used in the production number for the number of digits insufficient. With the latter example above, as there are only three numeric portions, the number of digits insufficient is one, and thus the process acquires an alphabet for one digit. In this example, the process acquires the first letter S for the one digit.

The alphabets are converted to numbers 1, 2, 3, . . . and 26 in the order of A, B, C, . . . and Z, respectively. Because the S is the 19th alphabet counted from A, the S is converted to a number 19. When the number is a two digit number as in the foregoing, only the numeral in the units place is used as the numeral of that digit. In this example, it is the numeral 9.

At Step S2120, the process generates an identification code from the four numerals acquired. In the former example, the process generates 4567, which is the numerals arranged in descending order from the top, as an identification code. Meanwhile, in the latter example, the process arranges the numeric portions in descending order from the top and adds the remaining numeral obtained by converting the alphabet to generate 4569 as an identification code.

While an identification code is generated by arranging the numerals in descending order from the top, and when the number of numerals are insufficient, alphabets are used being converted, the embodiment is not restricted to this. A number obtained by arranging the numerals in ascending order from the bottom, or a number obtained by obtaining four characters of a production number from the top, converting alphabets as in the foregoing when the alphabets are included, and arranging them in descending order from the top can be used as an identification code.

After the identification code is generated at Step S2120, the process determines, at Step S2125, whether or not the identification code generated is duplicative of any of the identification codes in the list stored in the storage module 53.

When it is duplicative (YES at Step S2125), the process advances to Step S2130, and adds one to the identification code as a 4-digit number in decimal system to modify the identification code. Then, the process returns to Step S2120 and next to Step S2125, and determines whether or not the identification code is duplicative. In contrast, when it is not duplicative (NO at Step S2125), the process advances to Step S2135, settles the identification code as the identification code of the projector 13, and ends the process.

In the foregoing examples, the identification code is entered only for a single projector 13, the connection is established with the single projector 13, and the information is transmitted only to the single projector 13. However, when a meeting room is large and a meeting is held with a large number of participants in the meeting room, a plurality of screens 36 may be used such that all of the participants can see the same information. At this time, it needs to make the same information be displayed being projected on the screens 36 using a plurality of projectors 13.

Figure 22:
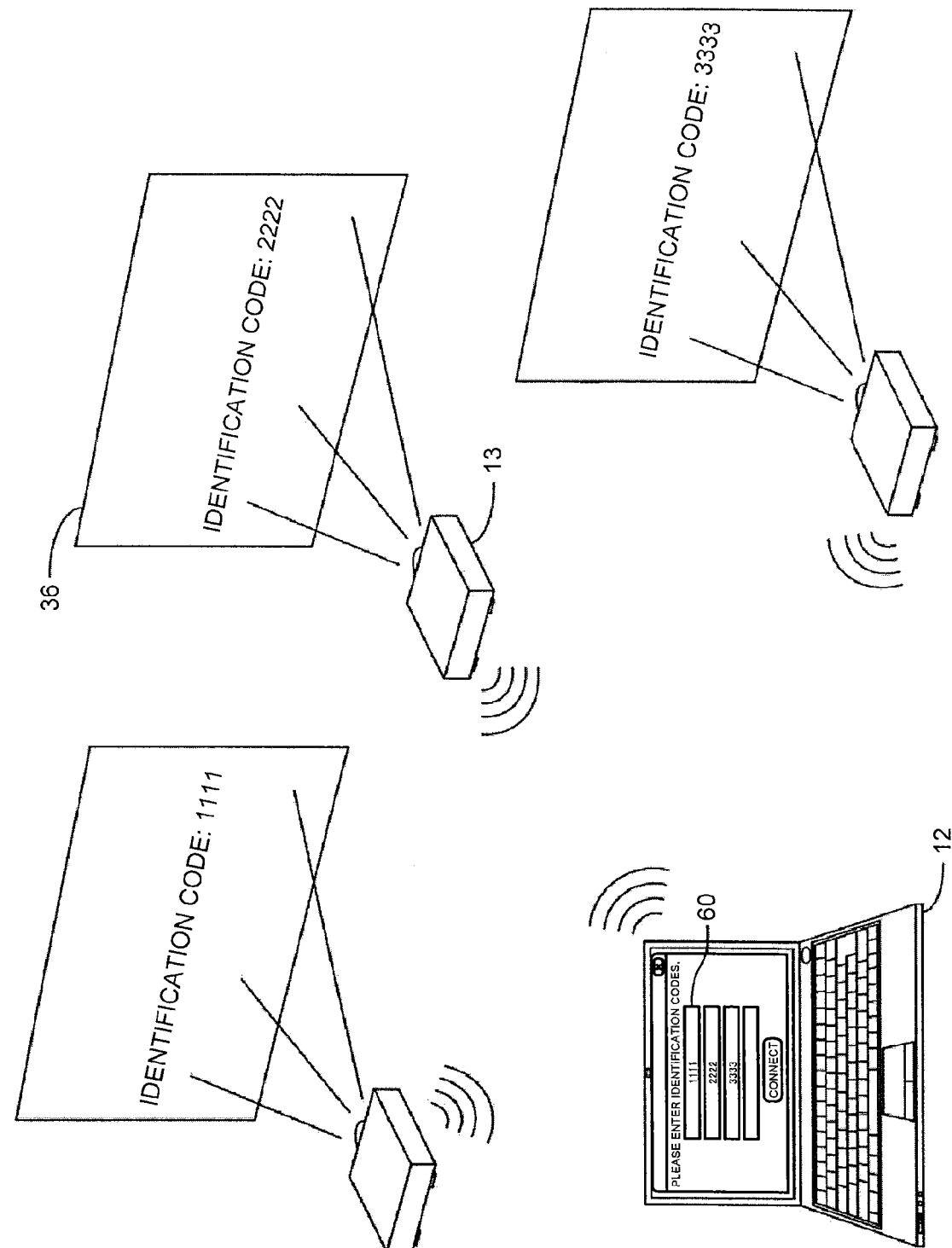
FIG. 22 is a diagram illustrating a situation of identification codes being entered to the information input device while a plurality of information output devices display the identification codes thereof when the information output devices are to be made to project the same information.

Thus, the entry screen for identification code can include a plurality of entry windows 60 so that each of the identification codes of a plurality of information output devices 11 can be entered. In FIG. 22, three units of the information output devices 11 display the identification code held by themselves by projecting on the respective screens 36, and the user looks at them and enters the respective identification codes on the entry screen.

Consequently, each of the projectors 13 can display the single piece of information transmitted from the PC 12 by projecting on the respective screens 36. Furthermore, with a single operation, the same information can be projected on the screens 36.

The present invention uses an identification code used only for identifying a connection destination, and can establish a connection by entering the identification code, whereby the security can be ensured and the connection can be achieved easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information input device that performs a process of transmitting information to an information output device to make the information output device output the information, the information input device comprising:
    a communication module configured to establish communication with information output devices;
    an information acquiring module configured to acquire device information of the respective information output devices including an identification code used only for identifying each of the information output devices;
    an input receiving module configured to receive an entry of an identification code from a user; and
    a device specifying module configured to
        search the device information acquired from the respective information output devices for device information including an identification code that matches the identification code received by the input receiving module,
        acquire, from the device information including the identification code that matches the identification code entered by the user, required information required to establish a connection and communicate with an identified information output device identified by the identification code entered by the user, and
        give instructions to the communication module to transmit the information using the required information to the identified information output device,
    wherein the information acquiring module acquires the identification codes from the respective information output devices to communicate with one or more of the respective information output devices.

2. The information input device according to claim 1, wherein
    the communication module detects a signal including the device information transmitted by the identified information output device at a specific time interval, and establishes communication with the identified information output device.

3. The information input device according to claim 1, wherein
    the input receiving module makes a display device display an entry screen having only a single entry window for entering the identification code.

4. The information input device according to claim 3, wherein
    the entry window permits an address of or a device name of the identified information output device to be entered in place of the identification code.

5. The information input device according to claim 4, wherein
    the entry screen has a plurality of entry windows for entering a plurality of identification codes, the addresses, or the device names.

6. An information output device that performs a process of displaying information received from the information input device according to claim 1, the information output device comprising:
    an identification code generator configured to generate an identification code that is used only for identifying the information output device using assignment information assigned to the information output device or input information entered;
    a communication module configured to transmit device information of the information output device including the identification code as a signal at a specific time interval, and establish communication with the information input device; and
    a display module configured to display the information received from the information input device by the communication module.

7. The information output device according to claim 6, wherein
    the display module displays the identification code generated so as to be entered in the information input device.

8. The information output device according to claim 6, wherein
    the assignment information is a MAC address or a production number.

9. The information output device according to claim 6, wherein
    the communication module acquires one or more pieces of device information of one or more other information output devices from the other information output devices, and
    the identification code generator checks whether or not the identification code generated is duplicative of one or more identification codes included in the one or more pieces of device information acquired and modifies, when the identification code is duplicative, the identification code to not be duplicative of the one or more identification codes included in the one or more pieces of information.

10. The information output device according to claim 9, further comprising a notifying module configured to give, when the identification code is duplicative, notice of the identification code being duplicative.

11. An information processing system including:
    an information input device that performs a process of transmitting information to an information output device to make the information output device output the information, the information input device comprising:
        a communication module configured to establish communication with information output devices;
        an information acquiring module configured to acquire device information of the respective information output devices including an identification code used only for identifying each of the information output devices;
        an input receiving module configured to receive an entry of an identification code from a user; and
        a device specifying module configured to
            search the device information acquired from the respective information output devices for device information including an identification code that matches the identification code entered by the user,
            acquire, from the device information including the identification code that matches the identification code entered by the user, required information required to establish a connection and communicate with an identified information output device identified by the identification code entered by the user, and give instructions to the communication module to transmit the information using the required information to the identified information output device, wherein the information acquiring module acquires the identification codes from the respective information output devices to communicate with one or more of the respective information output devices, and wherein the information processing system further includes one or more information output devices according to claim 6.

12. The information processing system according to claim 11, further comprises a server configured to provide information, wherein the server holds an identification code used only for identifying the server, and the information input device receives the information provided from the server and transmits the information to the information output device to make the information output device display the information in response to receiving an entry of the identification code of the server and an entry of the identification code of the identified information output device.

13. The information processing system according to claim 11, further comprises a storage medium configured to store therein information, wherein the storage medium holds an identification code used only for identifying the storage medium, and the information input device acquires the information from the storage medium and transmits the information to the information output device to make the information output device display the information in response to receiving an entry of the identification code of the storage medium and an entry of the identification code of the identified information output device.

14. A non-transitory computer-readable recording medium that contains computer-readable instructions that when executed by an information processing system including an information input device that includes a computer and transmits information and an information output device that outputs the information received, causes the computer included in the information processing system to perform a method comprising:

establishing communication between the information input device and information output devices;

acquiring device information of the respective information output devices including an identification code used only for identifying each of the information output devices;

receiving an entry of an identification code entered by a user; and searching the device information acquired from the respective information output devices for device information including an identification code that matches the identification code entered by the user;

acquiring, from the device information including the identification code that matches the identification code entered by the user, required information required to establish a connection and communicate with an identified information output device identified by the identification code entered by the user; and transmitting the information to the identified information output device using the required, information wherein in the acquiring of the device information, the identification codes are acquired from the respective information output devices to communicate with one or more of the respective information output devices.

15. The information input device according to claim 1, further comprising:

a storage module that stores the device information acquired by the information acquiring module in a table that associates the device information, required information corresponding to the device information and corresponding identification codes.

16. The information input device according to claim 15, wherein the required information includes at least one of internet protocol (IP) addresses of the information output devices and names of the information output devices.

* * * * *